US008719699B2

(12) United States Patent
O'Brien

(10) Patent No.: US 8,719,699 B2
(45) Date of Patent: May 6, 2014

(54) DYNAMIC POSITIONING OF COMPONENTS USING DOCUMENT TEMPLATES

(75) Inventor: Stephen James O'Brien, San Jose, CA (US)

(73) Assignee: Typefi Systems Pty. Ltd., Peregian Beach QLD (AU)

( * ) Notice: Subject to any disclaimer, the term of this patent is extended or adjusted under 35 U.S.C. 154(b) by 1115 days.

(21) Appl. No.: 11/597,162

(22) PCT Filed: May 26, 2005

(86) PCT No.: PCT/AU2005/000740
§ 371 (c)(1),
(2), (4) Date: Jul. 6, 2009

(87) PCT Pub. No.: WO2005/116864
PCT Pub. Date: Dec. 8, 2005

(65) Prior Publication Data
US 2012/0042239 A1    Feb. 16, 2012

(30) Foreign Application Priority Data

May 26, 2004    (AU) ................................ 2004902920
Jun. 2, 2004    (AU) ................................ 2004902961
Oct. 8, 2004    (AU) ................................ 2004905805

(51) Int. Cl.
*G06F 17/27*    (2006.01)

(52) U.S. Cl.
USPC ........... 715/243; 715/234; 715/235; 715/239; 715/247; 715/248

(58) Field of Classification Search
USPC .................. 715/234, 235, 236, 243, 247, 248
See application file for complete search history.

(56) References Cited

U.S. PATENT DOCUMENTS

| | | | |
|---|---|---|---|
| 5,517,621 A | 5/1996 | Fukui et al. | |
| 5,553,217 A | 9/1996 | Hart et al. | |
| 5,911,146 A | 6/1999 | Johari | |
| 5,926,825 A | 7/1999 | Shirakawa | |
| 6,026,417 A | 2/2000 | Ross et al. | |
| 6,038,567 A | 3/2000 | Young | |
| 6,205,452 B1 | 3/2001 | Warmus et al. | |
| 6,327,599 B1 | 12/2001 | Warmus et al. | |
| 6,366,918 B1 | 4/2002 | Guttman et al. | |
| 6,369,840 B1 * | 4/2002 | Barnett et al. ................ | 715/853 |
| 6,584,480 B1 | 6/2003 | Ferrel et al. | |
| 6,826,727 B1 * | 11/2004 | Mohr et al. .................... | 715/235 |
| 6,844,940 B2 | 1/2005 | Warmus et al. | |
| 6,952,801 B2 | 10/2005 | Warmus et al. | |
| 6,988,139 B1 * | 1/2006 | Jervis et al. ................... | 709/226 |

(Continued)

FOREIGN PATENT DOCUMENTS

| | | |
|---|---|---|
| EP | 0 844 573 A3 | 5/1998 |
| EP | 0 860 797 A2 | 8/1998 |

*Primary Examiner* — Andrew Dyer
(74) *Attorney, Agent, or Firm* — Vierra Magen Marcus LLP

(57) ABSTRACT

A method of creating a template for presenting content within a document. The method includes defining a plurality of components, each including at least one content region and at least one of a frame, a template perimeter and an object. A number of links are then defined between the components, each link representing a respective spatial relationship. A processing system is then responsive to the template to populate the content region with content, generate a representation of each component and position the representation of each component in the document using the defined links to control the relative spatial positioning of the components.

37 Claims, 23 Drawing Sheets

(56) References Cited

U.S. PATENT DOCUMENTS

| | | | |
|---|---|---|---|
| 7,467,134 B2 * | 12/2008 | Bayiates | 1/1 |
| 7,657,832 B1 * | 2/2010 | Lin | 715/234 |
| 7,721,202 B2 * | 5/2010 | Fuchs et al. | 715/249 |
| 8,516,383 B2 * | 8/2013 | Bryant et al. | 715/763 |
| 2002/0040373 A1 | 4/2002 | Wichert et al. | |
| 2002/0040375 A1 | 4/2002 | Simon et al. | |
| 2002/0095439 A1 | 7/2002 | Long et al. | |
| 2002/0122067 A1 | 9/2002 | Geigel et al. | |
| 2004/0001099 A1 | 1/2004 | Reynar et al. | |
| 2004/0078759 A1 * | 4/2004 | Ohashi et al. | 715/517 |
| 2004/0205572 A1 * | 10/2004 | Fields et al. | 715/513 |
| 2007/0065011 A1 * | 3/2007 | Schiehlen | 382/181 |

* cited by examiner

"There is
no one
who loves

Fig. 1A

But I must explain to you how all this mistaken idea of denouncing pleasure and praising pain was born and I will give you a complete account of the system, and expound the actual teachings of the great explorer of the truth, the master-builder of human happiness. No one rejects, dislikes, or avoids pleasure itself, because it is pleasure, but because those who do not know how to pursue pleasure rationally encounter consequences that are extremely painful. Nor again is there anyone who loves or pursues or desires to obtain pain of itself, because it is pain, but because occasionally circumstances occur in which toil and pain can procure him some great pleasure.

"There is
no one
who loves
pain
itself,
who
seeks"

Fig. 1B

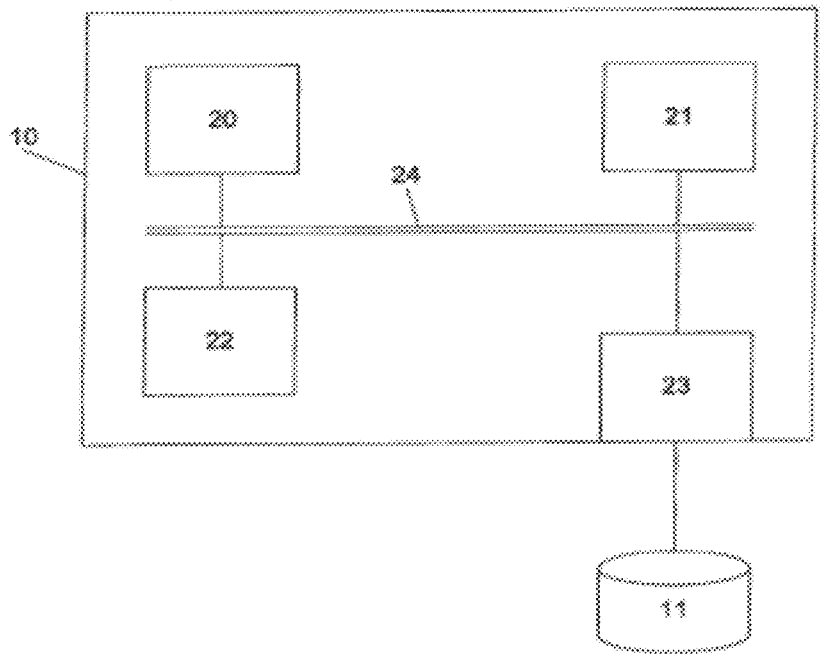

Fig. 4

| TOTAL SALES | Q1 | Q2 | Q3 | Q4 |
|---|---|---|---|---|
| East | 20,000 | 30,000 | 25,500 | 28,600 |
| South | 30,200 | 38,000 | 29,500 | 31,300 |
| North | 26,000 | 25,500 | 30,000 | 28,600 |
| West | 38,000 | 25,500 | 29,500 | 30,200 |

Fig. 8B

| TOTAL SALES | Q1 | Q2 | Q3 | Q4 |
|---|---|---|---|---|
| East | 20,000 | 30,000 | 25,500 | 28,600 |
| South | 30,200 | 36,000 | 29,500 | 31,300 |
| North | 26,000 | 25,500 | 30,000 | 28,600 |
| West | 38,000 | 25,500 | 29,500 | 30,200 |

Fig. 9B

| TOTAL SALES | Q1 | Q2 | Q3 |
|---|---|---|---|
| East | 20,000 | 30,000 | 25,500 |
| South | 30,200 | 38,000 | 29,500 |
| North | 26,000 | 25,500 | 30,000 |
| West | 38,000 | 25,500 | 29,500 |

Fig. 10B

DYNAMIC POSITIONING OF COMPONENTS USING DOCUMENT TEMPLATES

BACKGROUND OF THE INVENTION

The present invention is directed to an automated method of preparing content with design in a presentation that is suitable for printing and/or electronic publishing.

Additionally, the present invention relates to a method and apparatus of creating and using a template for presenting content for printing and/or electronic publishing, as well as a method and apparatus of creating and using a table template for presenting table content in a table.

DESCRIPTION OF THE PRIOR ART

The reference to any prior art in this specification is not, and should not be taken as, an acknowledgment or any form of suggestion that the prior art forms part of the common general knowledge.

Most document production is achieved without using any kind of structure or automation. In order to improve the efficiency of the document production process varying degrees of automation are available. Current electronic typesetting and document layout and publishing systems for printing and/or electronic publishing offer automation features that utilise different types of data to produce a completed work. The content is generally produced separately from the design or stylistic content which gives the finished work a particular appearance. This appearance may be common to a group of works across a series, lending the series a consistent format that is often designed to appeal to potential purchasers.

The creator of the content, hereinafter called the content creator, writes the text of the work. A particular work may also require the production of other material such as drawings and other graphical Figures. These may be created or prepared by the content creator, who may be a content creator preparing the written content, or by another content creator such as a technical illustrator or an artist. The raw text and other material are hereinafter termed the content and are not necessarily formatted for the final appearance of the work.

The stylistic appearance is generally controlled by a graphic, document or Web designer. The designer is charged with the task of creating an aesthetically pleasing or efficient design that may be intended either for print or for electronic publishing in page form or in some other geometric space. We will henceforth refer to the output of the design as a partial page, a full page or a series of pages, although it may include other display spaces such as computer monitors or other display devices.

The designer typically prepares sample pages and/or produces written guidelines which dictate the finished appearance of the work. The sample pages and guidelines may be created using known desktop publishing software packages such as ADOBE PAGEMAKER™, ADOBE INDESIGN™ or QUARKXPRESS™, Web page content creation software, or recorded using a word-processing system or other data-processing system. The stylistic information is hereinafter called the design.

Once the design has been approved, and the content has been completed, both are sent to an operator who prepares the presentation of the work by manually combining the content with the design and layout rules specified in the design. The process is a manually-intensive one, with scope for error and misunderstanding. A typical work such as a reference book containing several hundred pages may have a fairly complex layout including sidebars, drawings, photographs, graphs and tables, and may take an operator from several weeks to several months to prepare manually.

The process is very subjective, and even by using a number of positioning rules which define how the positions of certain objects interrelate, it is possible that two different operators working independently on the same material would produce two very different results.

Documents often are comprised of multiple components, which are presented besides a single main story or text block. For example, they may include other supporting components including headers and footers, page numbers, title pages, footnotes and tables of content. They may also include components that are part of the main story, but stand apart from the text in certain ways such as pull-out quotes, sidebars, tables and images.

In document production these additional components are referred to as elements or floats. When a document has been given a design sophistication that raises it above the level of plain text, this sophistication often evidences itself in the design of these elements. For example, the pull-out quote may have lines drawn above and below it; a sidebar may be designed such that a background shadow is always displayed behind; the table may always have a border drawn around it; and the image elements may include further sub-elements that display the image's caption or copyright information. All of these additional items define an element's overall appearance.

Thus, within a typical document or collection of documents the overall design of an element is required to remain constant while each use of that element may change in key respects to allow for varying content lengths. In other words, the spatial arrangement of an element must be allowed to change to adapt to the varying content that is required to be contained within that element. For example, if a pull-out quote on a page has been designed such that there are always highlight lines drawn above and below the pull-out quote, shown in FIG. 1A, then those lines are usually arranged such that they must appear in the same position relative to the length of the textual material contained in the pull-out quote.

Where the quote contains more material it may contain more rows of text and therefore the relative position between the upper and lower highlight lines will differ as shown in FIG. 1B. This means elements are required to vary according to the differing demands of the content contained in each use. Typically, an element will be allowed to vary in some key way such as by a variation in size to accommodate different content.

The current state-of-the-art in publishing systems provide no means for supporting the conflicting requirements of maintaining a consistent look for an element while also allowing certain aspects of that element to automatically adapt to changes within the content displayed in that element.

As a user prepares content on a page or screen for print or online display by creating and formatting each example of an element they must make certain design decisions. For example, assessing how the element must be adjusted to suit the content contained in that element. Typically they will then manually adjust the dependent design components in as precise a fashion as time and budget allows. When a document contains many hundreds of elements each with complex design components contained therein, updating each element's design components to suit the overarching design style that is being applied to the document can prove to be very time consuming and expensive.

In summary, the current state of the art is defined by manual desktop publishing systems, semi-automated desktop publishing systems, and fully automated publishing systems. The content and the design information are both stored in data sets which may be a computer-readable file or files, a data stream, one or more database records, and in all instances may include XML or other tagging. In general these systems align along two axis: the simpler to use systems offer the highest and most flexible presentation sophistication but offer the lowest degree of automation; the most complex systems offer a high degree of automation traded off against a lower level of presentation sophistication.

SUMMARY OF THE PRESENT INVENTION

In a first broad form the present invention provides a method of creating a template for presenting content within a document, wherein the method includes, in a processing system:
- a) defining a plurality of components, the components including:
  - i) at least one content region; and,
  - ii) at least one of:
    - (1) a frame;
    - (2) a template perimeter; and,
    - (3) an object;
- b) defining a number of links, each link representing a respective spatial relationship between at least one of any two components, and a component and the document, such that in use, a processing system is responsive to the template to:
  - i) populate the content region with content;
  - ii) generate a representation of each component; and,
  - iii) position the representation of each component in the document using the defined links to control the relative spatial positioning of the components.

The method may include, in the processing system:
- a) generating component data indicative of the defined components; and,
- b) generating link data indicative of the defined links; and,
- c) storing the template by storing the component data and link data in a data store.

The method can include, in the processing system, defining content region properties, the content region properties defining at least one of:
- a) an appearance of the content region;
- b) a size of a content region perimeter;
- c) a content type; and,
- d) an appearance of the content.

The method also preferably includes, in the processing system, defining component properties, the component properties defining at least one of:
- a) an appearance of the component; and,
- b) a size of the component.

The method generally includes, in the processing system, defining link properties, the link properties defining at least one of:
- a) a source and a destination for the link; and,
- b) a length associated with the link.

Typically the source includes at least one of a component and the document.

It is also preferable that the method further includes, in the processing system, defining a repeat function associated with at least one component, the repeat function representing rules for repeating the presentation of the respective at least one component.

Generally the repeat function is associated with at least one component and an associated link.

The method usually further includes, in the processing system, defining a second repeat function associated with at least one second component, the repeat function representing rules for repeating the presentation of the respective second component.

The method may include, in the processing system, associating the repeat function with a first content region, wherein, in use, a processing system is responsive to the template to:
- a) determine a number of content portions;
- b) generate a first content region corresponding to each of the determined number of content portions;
- c) populating each content portion with a respective content portion;
- d) generating a representation of each content region using content region properties; and,
- e) positioning the representation of each content region within the document using a defined link.

In a second broad form the present invention provides a method of populating a template to present content within a document, wherein the method includes, in a processing system:
- a) determining from the template, a plurality of components including:
  - i) at least one content region; and,
  - ii) at least one of:
    - (1) a frame;
    - (2) a template perimeter; and,
    - (3) an object;
- b) determining from the template a number of links defining respective spatial relationship between at least one of any two components, and a component and the document;
- c) populating the content region with the content;
- d) generating a representation of each component; and,
- e) using the defined links to control the spatial positioning of the components within the document.

The method typically includes, in the processing system:
- a) determining from the template, component data indicative of the defined components; and,
- b) determining from the template, link data indicative of the defined links.

It is preferable that the method includes, in the processing system:
- a) determining from the template, content region properties, the content region properties defining at least one of:
  - i) an appearance of the content region;
  - ii) a size of a content region perimeter;
  - iii) a content type; and,
  - iv) an appearance of the content; and,
- b) generating the content region representation in accordance with the content region properties.

Generally the method includes, in the processing system:
- a) determining from the template, component properties, the component properties defining at least one of:
  - i) an appearance of the component; and,
  - ii) a size of the component; and,
- b) generating the component representation in accordance with the content region properties.

The method may include, in the processing system:
- a) determining link properties, the link properties defining at least one of:
  - i) a source and a destination for the link; and,
  - ii) a length associated with the link.
- b) positioning the component in the document in accordance with the link properties.

Typically the source includes at least one of a component and the document.

The method can include, in the processing system:
a) generating a component list indicative of each of the components;
b) for each component in the list:
   i) determining any links associated with the component;
   ii) determining from the link if the spatial position of the component is defined; and,
   iii) removing the component from the list in response to a successful determination:
c) if there are no components remaining in the list, generating a representation of the components in the document using the defined spatial positions;
d) if there are components remaining in the list, and components were removed during step (b), repeating step (b); and,
e) if there are components remaining in the list, and components were not removed during step (b), determining that the spatial position of the remaining components cannot be determined.

It is also preferable that the method further includes, in the processing system:
a) determining a repeat function associated with at least one component, the repeat function representing rules for repeating the presentation of the respective component; and,
b) presenting the at least one component a number of times in accordance with the associated repeat function.

It is also preferable that the repeat function is associated with at least one component and an associated link, and wherein the method includes, in the processing system, presenting each at least one component in accordance with the associated link.

Preferably the method further includes, in the processing system:
a) determining a second repeat function associated with at least one second component, the repeat function representing rules for repeating the presentation of the respective second component; and,
b) presenting the at least one second component a number of times in accordance with the associated repeat function.

Typically the method includes, in the processing system, associating the repeat function with a first content region, wherein the method includes in the processing system:
a) determining a number of content portions;
b) generating a first content region corresponding to each of the determined number of content portions;
c) populating each content portion with a respective content portion;
d) generating a representation of each content region using the content region properties; and,
e) positioning the representation of each content region within the document using a defined In a third broad form the present invention provides a method of creating a template for presenting content within a document, wherein the method includes, in a processing system:
a) defining at least one content region, the content region having associated content region properties defining at least one of:
   i) an appearance of the content region;
   ii) a size of a content region perimeter;
   iii) a content type; and,
   iv) an appearance of the content;
b) defining at least one link representing a respective spatial relationship for the at least one content region; and,
c) defining at least one repeat function associated with the at least one content region, such that in use, a processing system is responsive to the template to:
   i) determine a number of content portions;
   ii) generate a content region corresponding to each of the determined number of content portions, using the defined at least one content region;
   iii) populate each content region with a respective content portion; and,
   iv) generate a representation of each content region using the content region properties; and,
   v) position the representation of each content region within the document using a defined link.

The method may include, in the processing system:
a) defining a plurality of components, the components including the content region and at least one of:
   i) a frame;
   ii) a template perimeter; and,
   iii) an object;
b) defining a number of links, each link representing a respective spatial relationship between at least one of any two components, and a component and the document, such that in use, a processing system is responsive to the template to:
   i) populate the content region with content;
   ii) generate a representation of each component; and,
   iii) position the representation of each component in the document using the defined links to control the relative spatial positioning of the components.

The method can include, in the processing system:
a) generating component data indicative of the defined components;
b) generating link data indicative of the defined links; and,
c) storing the template by storing the component data and link data in a data store.

Generally the method includes, in the processing system, defining component properties, the component properties defining at least one of
a) an appearance of the component; and,
b) a size of the component.

Typically the method includes, in the processing system, defining link properties, the link properties defining at least one of:
a) a source and a destination for the link; and,
b) a length associated with the link.

The source may include at least one of a component and the document.

It is preferable that the method further includes, in the processing system, defining a second repeat function associated with at least one second component, the repeat function representing rules for repeating the presentation of the respective second component.

In a fourth broad form the present invention provides a method of populating a template for presenting content within a document, wherein the method includes, in a processing system:
a) determining from the template, at least one content region, the content region having associated content region properties defining at least one of:
   i) an appearance of the content region;
   ii) a size of a content region perimeter;
   iii) a content type; and,
   iv) an appearance of the content;

b) determining from the template, at least one link representing a respective spatial relationship for the at least one content region; and, c) determining from the template at least one repeat function associated with the at least one content region;

d) determining from the content, a number of content portions;

e) generating a content region corresponding to each of the determined number of content portions, using the determined at least one content region;

f) populating each content region with a respective content portion;

g) generating a representation of each content region using the content region properties; and, h) positioning the representation of each content region within the document using a defined link.

Typically the method includes, in the processing system:

a) determining from the template, component data indicative of the defined components; and, b) determining from the template, link data indicative of the defined links.

Generally the method includes, in the processing system:

a) determining from the template, content region properties, the content region properties defining at least one of:
  i) an appearance of the content region;
  ii) a size of a content region perimeter;
  iii) a content type; and,
  iv) an appearance of the content; and, b) generating the content region representation in accordance with the content region properties.

It is preferable that the method includes, in the processing system:

a) determining a plurality of components, the components including the content region and at least one of:
  i) a frame;
  ii) a template perimeter; and,
  iii) an object;

b) determining a number of links, each link representing a respective spatial relationship between at least one of any two components, and a component and the document;

c) generate a representation of each component; and, d) position the representation of each component in the document using the defined links to control the relative spatial positioning of the components.

Usually the method includes, in the processing system:

a) determining link properties, the link properties defining at least one of:
  i) a source and a destination for the link; and,
  ii) a length associated with the link.

b) positioning the component in the document in accordance with the link properties.

Typically the source includes at least one of a component and the document.

Generally the method includes, in the processing system:

a) generating a component list indicative of each of the components;

b) for each component in the list:
  i) determining any links associated with the component;
  ii) determining from the link if the spatial position of the component is defined; and,
  iii) removing the component from the list in response to a successful determination:

c) if there are no components remaining in the list, generating a representation of the components in the document using the defined spatial positions;

d) if there are components remaining in the list, and components were removed during step (b), repeating step (b); and, e) if there are components remaining in the list, and components were not removed during step (b), determining that the spatial position of the remaining components cannot be determined.

It is preferable that the method further includes, in the processing system:

a) determining a second repeat function associated with at least one second component, the repeat function representing rules for repeating the presentation of the respective second component; and, b) generating a representation of the at least one second component;

c) positioning the at least one second component a number of times in accordance with the associated repeat function.

In a fifth broad form the present invention provides a method of creating a table template for presenting table content in respective cells, wherein the method includes, in a processing system, at least one of:

a) defining at least one of a row format and a column format for formatting cells;

b) defining a repeat function associated with the defined format, wherein in use, the table template is responsive to table content to:
  i) populate a number of cells with the table content; and,
  ii) format the populated cells using:
    (1) the defined format; and,
    (2) the repeat function.

In a sixth broad form the present invention provides a method of populating a table template for presenting table content in a table, the table template including at least one of a row format and a column format for formatting cells and a repeat function associated with at the defined format, wherein the method includes, in a processing system:

a) populating a number of cells with the table content; and, b) formatting the populated cells using:
  i) the defined format; and,
  ii) the repeat function.

In a seventh broad form the present invention provides a method of processing a template to present content within a document, the template including one or more components provided within a perimeter, together with a number of links defining relative spatial relationships between at least two of the perimeter and selected components, wherein the method includes, in the processing system:

a) creating a list of the components;

b) for each component on the list;
  i) determining whether at least one of a position and size is defined using the respective links;
  ii) removing the component from the list in response to a successful determination; and, c) if an component has been removed from the list, repeating step (b);

d) if no component is removed from the list, determining if any components remain in the list; and, determining the presence of at least one unresolvable link in response to a successful determination.

In an eighth broad form the present invention provides a processing station used for creating a template for presenting content within a document, wherein the processing station includes:

a) a display;

b) a processor for:

i) defining a plurality of components, the components including:
   (1) at least one content region; and,
   (2) at least one of:
      (a) a frame;
      (b) a template perimeter; and,
      (c) an object;
ii) defining a number of links, each link representing a respective spatial relationship between at least one of any two components, and a component and the document, such that in use, a processing system is responsive to the template to:
   (1) populate the content region with content;
   (2) generate a representation of each component; and,
   (3) position the representation of each component in the document using the defined links to control the relative spatial positioning of the components.

In a ninth broad form the present invention provides a processing station used for populating a template to present content within a document, wherein the processing station includes:
a) a display; and,
b) a processor for:
   i) determining from the template, a plurality of components including:
      (1) at least one content region; and,
      (2) at least one of:
         (a) a frame;
         (b) a template perimeter; and,
         (c) an object;
   ii) determining from the template a number of links defining respective spatial relationship between at least one of any two components, and a component and the document;
   iii) populating the content region with the content;
   iv) generating a representation of each component; and,
   v) using the defined links to control the spatial positioning of the components within the document.

In a tenth broad form the present invention provides a processing station used for processing a template to present content within a document, wherein the processing station includes:
a) a display;
b) a processor for:
   i) creating a list of the components;
   ii) for each component on the list;
      (1) determining whether at least one of a position and size is defined using the respective links;
      (2) removing the component from the list in response to a successful determination; and,
   iii) if an component has been removed from the list, repeating step (b);
   iv) if no component is removed from the list, determining if any components remain in the list; and,
   v) determining the presence of at least one unresolvable link in response to a successful determination In an eleventh broad form the present invention provides a method of creating a template for presenting content within a document, wherein the method includes, in a processing system:
a) defining a plurality of components;
b) defining a number of links, each link representing a respective spatial relationship between at least one of any two components, and a component and the document, such that in use, a processing system is responsive to the template to:
   i) generate a representation of each component; and,
   ii) position the representation of each component in the document using the defined links to control the relative spatial positioning of the components.

In a twelfth broad form the present invention provides a method of populating a template to present content within a document, wherein the method includes, in a processing system:
a) determining from the template, a plurality of components;
b) determining from the template a number of links defining respective spatial relationship between at least one of any two components, and a component and the document;
c) generating a representation of each component; and,
d) using the defined links to control the spatial positioning of the components within the document.

In a thirteenth broad form the present invention provides a method of creating a template for presenting content within a document, wherein the method includes, in a processing system:
a) defining one or more components;
b) defining at least one link representing a respective spatial relationship for the at least one component; and,
c) defining at least one repeat function associated with the at least one component, such that in use, a processing system is responsive to the template to:
   i) determine a number of components using the repeat function;
   ii) generate a representation of each component; and,
   iii) positioning the representation of each component within the document using a defined link.

In a fourteenth broad form the present invention provides a method of populating a template for presenting content within a document, wherein the method includes, in a processing system:
a) determining from the template:
   i) at least one component;
   ii) at least one link representing a respective spatial relationship for the at least one component; and,
   iii) at least one repeat function associated with the at least one component;
b) determining a number of components using the repeat function;
c) generating a representation of each component; and,
d) positioning the representation of each component within the document using a defined link.

In a fifteenth broad form the present invention provides a method of creating a template for presenting content within a document, wherein the method includes, in a processing system:
a) defining a plurality of components, the components including:
   i) at least one content region; and,
   ii) at least one of:
      (1) a frame;
      (2) a template perimeter; and,
      (3) an object;
b) defining a predetermined offset with respect to at least one component, such that in use, a processing system is responsive to the template to:
   i) populate the content region with content;
   ii) generate a representation of the at least one component; and,
   iii) position the representation of the at least one component with respect to the content in accordance with the predetermined offset.

Typically the at least one component is at least part of a frame of the content region.

In a sixteenth broad form the present invention provides a method of creating a template for presenting content within a document, wherein the method includes, in a processing system:
 a) defining a plurality of components;
 b) defining component properties, the component properties defining at least one of
  i) an appearance of the component;
  ii) a size of the component;
  iii) a type of content associated with the component;
  iv) a spatial arrangement for the component;
  v) an appearance of content associated with the component; and,
 c) generating property data, the property data being stored as part of the document.

Typically the method further includes:
 a) defining document properties; and,
 b) storing the document properties as part of the property data.

In a seventeenth broad form the present invention provides a method of creating a template for presenting content within a document, wherein the method includes, in a processing system:
 a) defining a plurality of components;
 b) defining at least one directional link, each directional link representing a respective spatial relationship between at least a portion of a parent component and at least a portion of a child component, such that in use, a processing system is responsive to the template to:
  i) generate a representation of each component;
  ii) spatially arrange the representation of the parent component; and,
  iii) in response to the arranging of the parent component, spatially arrange the representation of the child component using the directional link.

Typically the arrangement is at least one of
 a) a spatial positioning; and,
 b) a component sizing.

In a eighteenth broad form the present invention provides a method of creating a template for presenting content within a document, wherein the method includes, in a processing system:
 a) defining a plurality of components, each component including at least one of:
  i) a resizing handle for controlling the size of the component; and
  ii) a movement handle for controlling the position of the component; and,
 b) defining a number of links, each link interconnecting the handles of any two components, such that in use, a processing system is responsive to the template to:
  i) generate a representation of each component;
  ii) spatially arrange the representation of each component in the document using the defined links, wherein the arrangement is controlled in accordance with the handle and the link.

Typically the arrangement is at least one of
 a) a spatial positioning; and,
 b) a component sizing.

In a nineteenth broad form the present invention provides a method of creating a template for presenting content within a document, wherein the method includes in a processing system:
 a) using a first set of instructions to define a plurality of components;
 b) using a second set of instructions, which cooperate with the first set of instructions, to define at least one of
  i) a predetermined offset with respect to at least one component; and,
  ii) a number of links, each link representing a respective spatial relationship between at least one of any two components; and, wherein, in use, the processing system is responsive to the template to:
   (1) generate a representation of each component; and,
   (2) spatially arrange the components in accordance with at least one of the predetermined offset and the links.

BRIEF DESCRIPTION OF THE DRAWINGS

An example of the present invention will now be described with reference to the accompanying drawings, in which:
—
 FIGS. 1A and 1B are of examples of element designs;
FIG. 4 is a schematic diagram of an example of a processing system for use in creating and/or populating templates;
FIG. 8B is a schematic diagram of an example of an element generated using the template of FIG. 7B;
FIGS. 9A and 9B are schematic diagrams of a second example of a repeating template and a resulting element generated using the process of FIGS. 7A and 8A;
FIGS. 10A and 10B are schematic diagrams of a third example of a repeating template and a resulting element generated using the process of FIGS. 7A and 8A.

DETAILED DESCRIPTION OF THE PREFERRED EMBODIMENTS

An example of a method for generating a template defining an element of float will now be described with respect to FIGS. 2A and 2B. In particular, the template defines a design which can be populated with content, thereby causing a float or element having a predetermined appearance to be created.

Figure 2A:
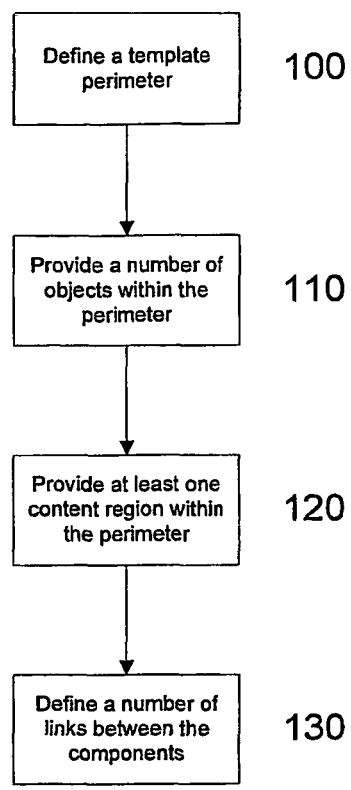
FIG. 2A is a flow chart of the process of creating a template for controlling the presentation of content within as an element.

The steps involved in defining an example template are set out in FIG. 2A.

In this example, at step 100 a perimeter for the resulting element or float is defined, which is used to allow the overall size of the resulting element to be determined, once it is populated with content. The template perimeter is therefore a selected area that is used for laying out objects and content regions in a particular format.

It will be appreciated by persons skilled in the art that the presence of a perimeter is not required and is included for illustrative purposes only, and in particular, to help with understanding the process involved. Thus, the provision of a perimeter is not essential, and any reference to a perimeter should therefore be considered as a reference to a general spatial extent of the component, as will be described in more detail below. In one example, any boundary to the template can be defined in terms of the positions of the components contained therein, with any appearance being defined by the provision of appropriate components, such as a suitable frame, or the like.

At step 110, at least one content region is provided within the perimeter. The content region is adapted to be populated with content to thereby allow content to be presented within the resulting float.

At step 120, a number of objects are provided within the perimeter, including for example, features such as frames, format items, or the like.

For the purpose of the following description, the content region, objects and perimeter will generally be referred to as components, and it will be appreciated by persons skilled in the art, that it is permissible for the template to include any combination of components, and it is not essential that each of a perimeter, content region and objects are defined, as will become apparent from the following example.

At step 130 a number of links are defined between the template perimeter, the objects and the content regions. The links define predetermined spatial relationships between the respective components in the template and are thereby used to control the design of the resulting element or float when the template is populated with data.

Figure 2B:
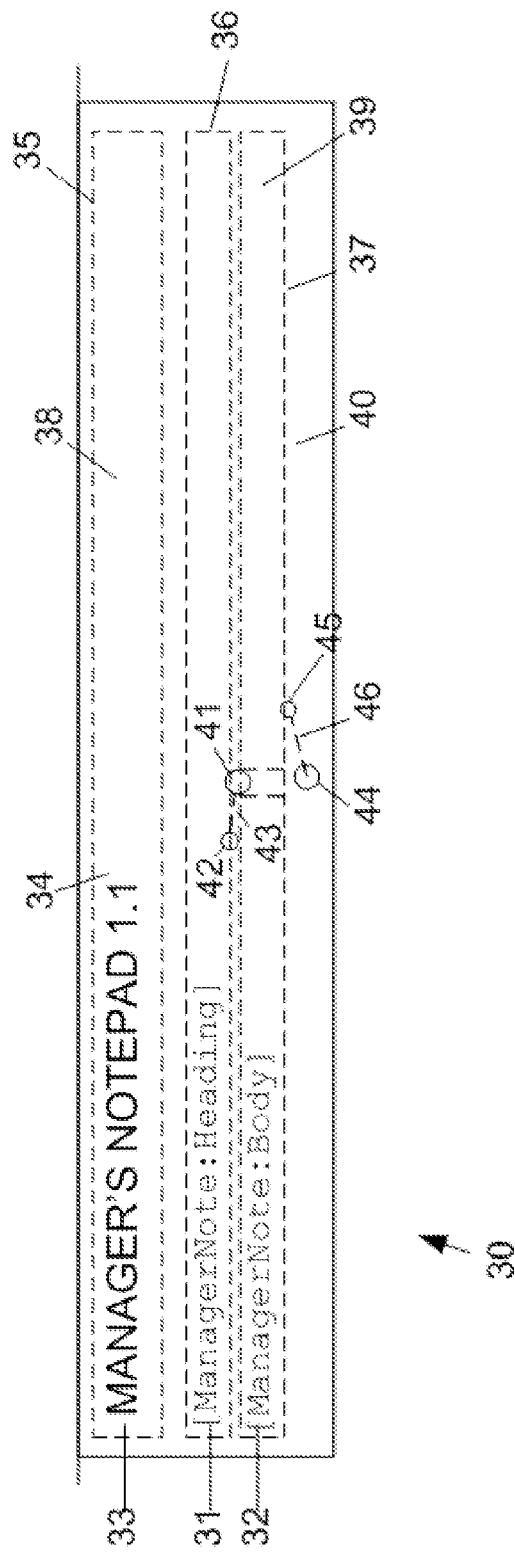
FIG. 2B is a schematic diagram of an example template.

FIG. 2B shows an example template created using this method.

In particular, in this example the template represents a sidebar design. The sidebar template 30, contains two markers 31, 32, corresponding to content regions, which will be replaced by content in use. In this example these include a heading marker 31 called ManagerNote:Heading and a main text marker called ManagerNote:Body.

The sidebar template also includes a number of objects, including a title 33, showing the sidebar title ("Manager's Notepad") and immediately thereafter a numerical counter 34 showing the chapter and sidebar number within that chapter ("1.1"). The objects also include frames 35, 36, 37 that contain the title 33, and the heading and main content regions 31, 32 respectively.

The sidebar template 30 includes two sets of background graphics 38, 39, displayed behind the title 33 and the frames 36, 37, respectively.

An overall perimeter is shown at 40, which represents the spatial extent of the sidebar and includes all of the objects and content regions.

In FIG. 2B, links are defined between respective frames 36, 37 and 37, 40. The relationships are shown using a large circle 41; 44 at the link source and a small circle 42; 45 at the link destination, with a dotted line 43; 46 between the circles 41, 42; 44, 45 completing the relationship.

Figure 3A:
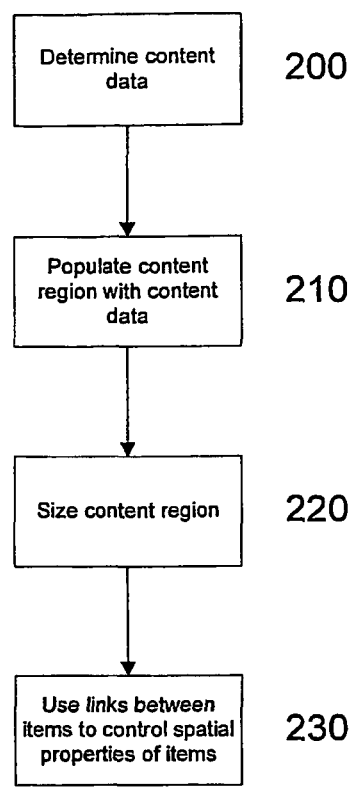
FIG. 3A is a flow chart of the process of populating a template for presenting content as an element.

The manner in which the template operates will now be described with reference to FIGS. 3A and 3B.

In particular, at step 200 it is necessary to determine the content to be presented. At step 210 it is necessary to populate the one or more of the content regions with the content. In general, the content region's size and optionally appearance is controlled in accordance with the quantity and/or type of content being presented. Thus, at step 220 the content region, and the frames defined around the content region are sized in accordance with the amount of content being presented.

Figure 3B:
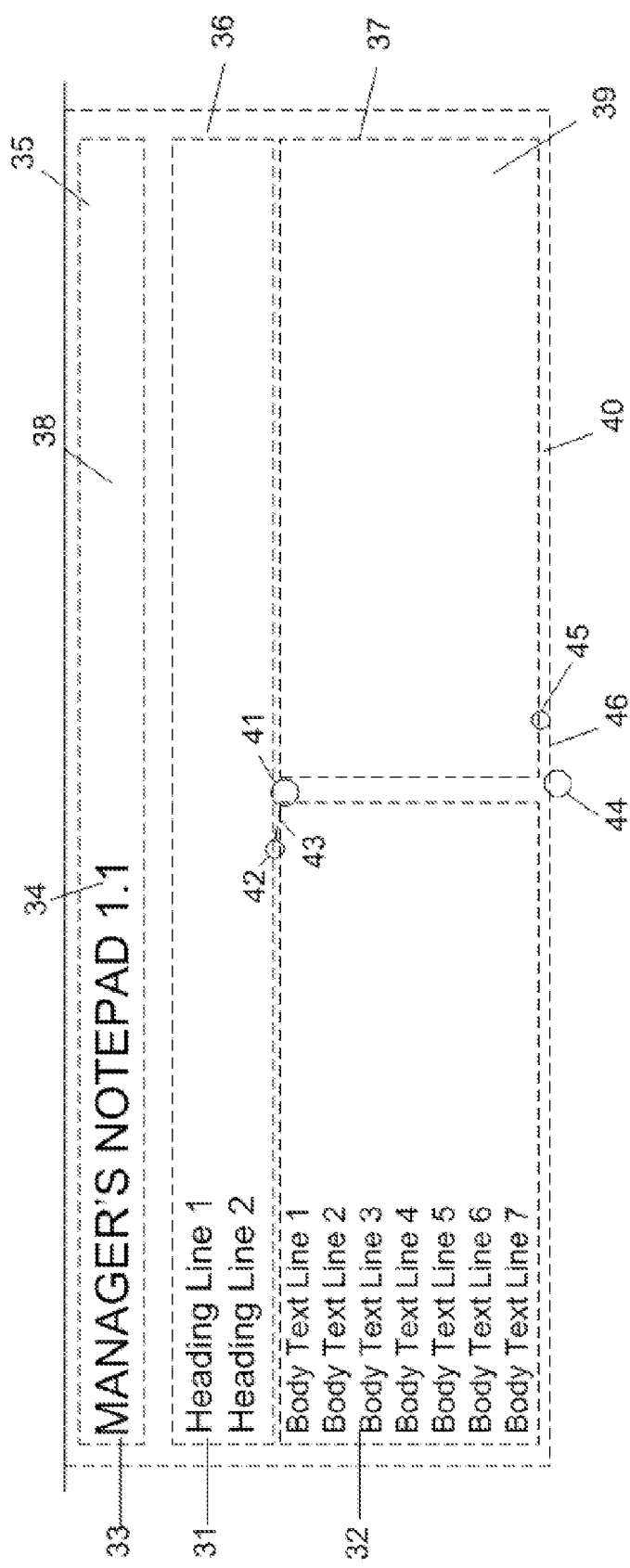
FIG. 3B is a schematic diagram of the element generated using the template of FIG. 2B.

Thus, FIG. 3B shows an example of how the frames 36, 37 and background graphics 39 expand when the content, in this example, two lines of heading text and seven lines of body text, are provided in the respective content regions 31, 32. Thus, the frame 36 around the heading text has expanded to accommodate the heading, with the frame 37 expanding to incorporate the body text.

Following, or more typically, during resizing of the frames defining the content regions, at step 220, the links are used to control the spatial positioning of the remaining components relative to the content regions at step 230.

Thus, in this example, expansion of the frame 36 results in the position of the frame 37 being adjusted in accordance with the link 43. In particular, the link 43 defines a predetermined separation between the frame 36 and the frame 37, so that as the frame 36 is expanded, the frame 37 is moved downward, as shown.

Similarly, movement and expansion of the frame 37 causes corresponding movement of the lower edge of the frame 40, in accordance with the link 44. In addition to this, as the upper edge of the frame 40 is fixed, this causes a corresponding increase in size of the frame 40.

Finally, as the frames 36, 37 have expanded the image 39 is also expanded to fill the frame.

Accordingly, it will be appreciated that the above-described methodology allows a template designed to be provided in which components within the template are spaced relative to each other in accordance with predetermined links. This allows the template to be populated with content with the content being used to control the size and/or appearance of a content region.

The size or appearance of the content region is then used to control the position of other components within the template in accordance with predefined spatial links. In addition to this, links may be defined between components in the template and predetermined locations within a document in which the template is to be presented.

Thus, for example, a first template component may be linked to a document header or footer, with remaining components being linked to the first component, such that overall, all components are positioned with respect to the first component and hence the header.

It will be appreciated by a person skilled in the art that this process may be performed utilising a processing system. An example of the processing system will now be described with reference to FIG. 4.

As shown the processing system 10 includes a processor 20, a memory 21, an input/output device 22 such as a keyboard and display, and an external interface 23 coupled together via a bus 24, as shown. The external interface 23 is typically provided to allow the processing system 10 to be coupled to a communications network, such as the Internet, or the like, or to a database 11, as shown.

In use, the processing system is adapted to allow users to define templates, as well as to populate the resulting templates to thereby allowing elements or floats to be incorporated into documents.

Thus, the processing system allows users to define a template perimeter, provide one or more objects and content regions within the perimeter, and define a number of links, each link defines a respective spatial relationship between these components. The processing system is also able to receive content data, and use this to populate a selected template, and generate a representation which can be used as a float or element within a document.

Accordingly, it will be appreciated that the processing system may be any form of processing system suitably programmed to perform the method, as will be described in more detail below. The processing system may therefore be a suitably programmed computer, laptop, palm computer, network or web server, or the like. Alternatively, specialised hardware or the like may be used.

It will therefore be appreciated that the methods herein described may be provided to a user through a computer software program. In one embodiment, computer software may be provided that can operate as a plugin to conventional software applications. It is preferable that the software plugin may be available for desktop publishing software packages such as ADOBE INDESIGN CS™ for various operating systems such as MACINTOSH™ and WINDOWS operating systems, however people skilled in the art will appreciate that a number of other software applications may be available which the plugin may operate with. It will also be appreciated that the computer software may be a stand alone application, rather than a software plugin.

The software plugin may be displayed within a software application as a toolbar or palette, wherein the user may select a number of features displayed visually in the toolbar or palette.

This may be performed as part of the methodology of an electronic publishing system, an example of which is described in our co-pending application WO2003/01538.

Figure 5A:
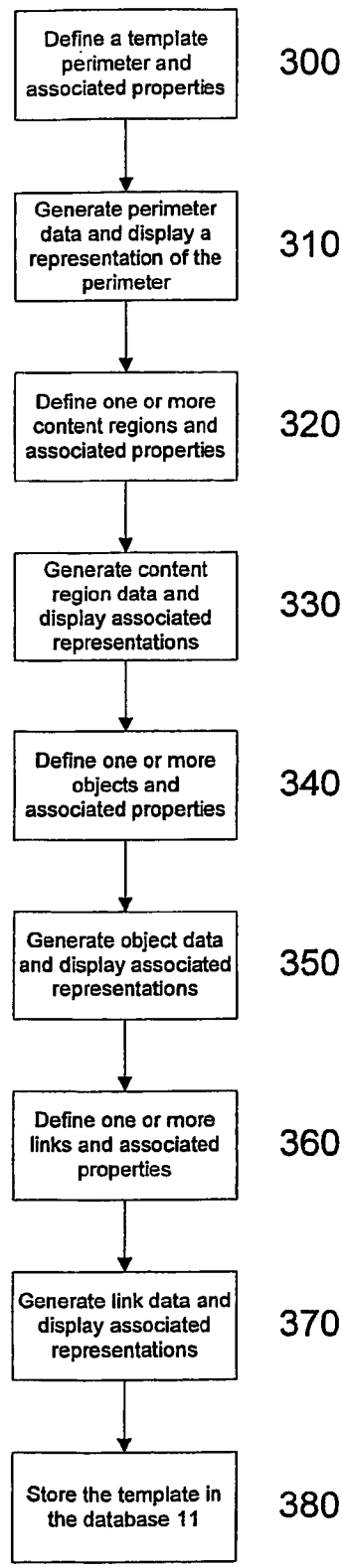
FIG. 5A is a flow chart of the process of creating a template using the processing system of FIG. 4.

In any event, an example of the process of defining a template for an element, using the processing system 10, will now be described in more detail with reference to the flow chart shown in FIG. 5A, and with respect to the template shown in FIG. 5B.

In this example, the template 400 includes a frame 410, having a dropped shadow in the form of an offset, partially obscured shaded frame 420. Inside the frame 410 is a title content region 430, which provides some information on the information to be presented therein. The title 430 is separated from a second content region 450 by a horizontal rule 440.

At step 300 the user determines a template, allowing the processing system 10 to generate or determine template perimeter data and display a representation of the template perimeter on the processing system 310.

This may be achieved in any one of a number of ways depending on the respective implementation.

Typically this is achieved by having the processing system present a blank template document on a GUI (graphical user interface). The user may then simply select a predetermined template having predetermined properties, or alternatively design a template utilising appropriate design systems. Thus for example, this could be achieved by indicating an area using a mouse on a computer display, to which a layout format will be applied. A drag and drop method could also achieve the same result allowing one of a number of predetermined template designs to be selected.

In this latter case, the predefined template perimeters could be stored in the database 11, and presented to the user on the GUI in response to an appropriate input command. In general, if a predetermined template perimeter is selected, this will have associated pre-defined properties, which specify details such as the appearance of the perimeter, predefined dimensions, border designs, and background images associated with the perimeter, or the like.

However, if these properties are not defined, or if they require alteration, this can be achieved using an appropriate interface provided on the GUI. Thus, for example, the user can right click on the perimeter to view and alter existing properties, or define new ones.

At the completion of this process, the processing system 10 will have stored perimeter data defining the selected template and any associated properties, and generated a representation that is presented on the GUI.

At step 320, the operator defines at least one content region having associated content region properties. Again, this may be achieved substantially as described above, for example by dragging and dropping predefined content regions, or by defining a new region from scratch.

In this instance, the content region properties will also typically define how the size of the content region is to be controlled depending on the content to be presented. Thus, this will typically define details of the content presentation, such as the font to be used, as well as the dimensions of the content region, thus for example specifying how the content region is to expand as additional content is added.

At step 330, the processing system 10 stores content region data defining the content region properties, and generates a respective representation of the defined content regions, which in this example, includes providing the dotted lines which show the perimeter of the first and second content regions 430, 450. It will be appreciated by those skilled in the art that the dotted lines may be replaced by respective frames forming part of the content region in some case. In either case, the content regions will be generally positioned within the template perimeter, thereby helping the user visualise the resulting appearance of the template once propagated.

At step 340, the user selects or defines a number of objects having associated object properties, and generally positions these relative to the template perimeter. The objects may correspond to generic shapes, or portions of other formatting lines, or the like. The object properties will define features of the object, such as the line length, thickness, weight, colour or the like.

Thus, in the above example, the objects will include the shaded frame 420, and the horizontal rule 440.

Again, it will be appreciated by a person skilled in the art that these may be defined using an appropriate input interface, or by dragging and dropping predefined objects into the template representation.

It will be appreciated that a number of objects may be defined in one process, thereby allowing for an efficient method of creating a number of objects. Thus, in this case, a single line could be defined, with this being replicated a number of times within the template to ensure consistency of appearance.

At step 350, the processing system stores object data and presents a representation of the objects within the template.

In the above description, the definition of an object, content region and perimeter are defined as separate steps, which are also separate to the steps of displaying the representations. However, it will be appreciated that this is for clarity of explanation only, and that in practice, these steps could be combined.

Furthermore, the general position of the components is defined to allow the user to generally indicate where the component will belong in the final design. It is possible that objects that include predefined positions or other properties may be restricted in not being able to be moved or generally positioned within the template perimeter. It is also possible that the spatial positions of particular components will need to be fixed, and therefore this can be achieved by providing an indication of this within the respective properties of the component.

Otherwise, the process moves to step 360, to allow the user to defines a number of links between the provided components in the template.

The links may be defined in any one of a number of ways. Typically however this is achieved by having the operator select an appropriate link defining tool, for example, from a respective toolbar presented on the GUI, and then using the tool to select a first component and then a second component. The processing system will determine the first and second selected components are to be linked, and operate to define a link there-between.

The link may include pre-defined link properties, which may alternatively be modified or defined by the user. In any event, the link properties will define the direction of the link, or at least the relative positions in a link hierarchy, as well as indications of the spatial separation to be defined by the link.

The spatial separation could be defined based on the current separation of the components within the template representation, so that this separation is maintained when the template is populated with content, or alternatively may be defined by having the user manually enter a distance. The spatial separation may also be limited by minimum and maximum values, or a series of pre-configured values or references to routines that can generate a range of values.

In a preferred example, the spatial relationships are defined using a point and click tool called the "Anchor". The user can use the tool to click on any two other frames to store the spatial relationship between their boundaries. This is done with the following steps:

Select the anchor tool.
Click on the mid-point on the edge of the frame that should be aligned to another frame.
Click on the mid-point of the frame that is being aligned to. That is, the frame that is acting as the base reference.
The software will store the distance between both midpoints as well as the hierarchy of the relationship between both points.

In any event, the processing system operates to store link data representing the links, and generates link representation at step 370, which in this case are by the arrows 460, 465, 470, 470.

Thus, in this case, the arrow 460 indicates that the spatial position of the line 440 will depend on the ultimate position of the lower edge of the content region 435. Thus, the vertical position of the horizontal rule 440 joining points 442 and 444 is defined in terms of the vertical position of the lower edge of border 435. In effect the vertical position of the line 440 is defined as being equal to the vertical position of the lower edge of border 435 with a pre-defined offset.

In this case, if for example way, in the formatted output the line 440 will lie exactly on the lower edge of border 435 if a 0 mm offset is defined, although the offset can be set to any positive or negative value to achieve a different effect. The end result is that if the lower edge of border 435 is moved, then the line 440 will move in a corresponding manner.

In a similar fashion, the upper edge of border 455, which surrounds the graphic image 450 forming the main content of frame 410, is defined in terms of having a defined offset from horizontal ruling 440. In this way, any movement of the title text 430 will result in line 440 moving due to the previously defined spatial relationship, and the image 450 moving due to its similar dependency on line 440. The lower edge of border 455 is defined in terms of the size of the image 450. If the image is changed for another, or re-sized, then the lower border is adjusted automatically as necessary.

The position of frame 410 is dependent on the lower edge of border 455. In the present example, the position is defined with a 0 mm offset, although this can be altered to leave a greater margin around the graphic image 450.

Finally, the last spatial relationship defined for the template 400 specifies the position of the shadow frame 420. Unlike the other relationships defined thus far, the shadow frame 420 is defined in terms of the position of the lower edge of frame 410, plus an offset of some distance, for example 6 mm. Another offset is defined in relation to the right-most edge of frame 410, giving the characteristic offset appearance of the shadow frame 420.

Thus, in this example, the predetermined offset allows a component to be resized automatically such that a constant distance, sometimes referred to as the BaselineGap, is maintained between content displayed within the component, and a particular boundary of the same component.

It will be appreciated by people skilled in the art that similar properties may be defined regarding a constant distance between any edge of the content region and a reference point of the text displayed within the content region. It is also possible that other properties may be defined such as a maximum and minimum height properties, and a maximum and minimum width properties for one or more components.

Once the relationship is stored it is possible for the software to replicate the relationship and so adapt when another factor such as another frame changes. When objects other than just borders are attached to each other striking dynamic designs can result. With this method relationships between object can become highly structured and interdependent.

For example, the bottom position of an object such as a line may be linked to another object such as a frame, which it turn is linked to other objects. (There are no practical limits on how many objects may be linked at one time.) Frames may also be linked in multiple directions. For example, the base, top, left and right-hand points of an object may be linked to other points on the page or within the element design. The edge of any drawn object such as a circle, line, hexagon, spline or other design element can be linked into the design elements in a long hierarchy resulting in a complex interplay that would be difficult and time-consuming to adjust by hand.

In any event, at step 380 the processing system operates to store the template in particular by storing the respective data generated during the creation process. The data may be stored in the memory 21, or in the database 11.

The data defining the template and associated components may be stored as a local setting, thus the properties may be specific for a particular document currently being defined by the user, or the properties may be stored globally for all subsequent documents created.

Thus, the properties may be stored within the document that is currently being formatted so that if the document is transported to a different computer system, the computer software provided thereon will be capable of extracting the properties from the document to thereby ensure the properties remain constant.

These properties may be available for a user to define using a palette displayed using computer software. However, people skilled in the art will appreciate that other common methods such as accessing properties through option menus or through programmatic means may also achieve the desired outcome.

The manner in which a template is populated with content will now be described with reference to FIGS. 6A to 6C.

In particular, at step 500 it is necessary for the processing system 10 to determine the content to be presented. It will be appreciated that this may be achieved in a number of manners depending on the respective implementation and may be achieved for example by receiving content via the I/O device, or the like.

At step 510 the processing system 10 will select a template. It is typical for a number of templates to be stored in the database 11, and these can be selected, either in accordance with user input commands or in dependence on the type of content to be presented. Thus, in general the processing system 10 will be adapted to select an appropriate template based on predetermined rules. This can include, for example, selecting the template such that when the resulting element is constructed it satisfies predetermined properties, such as having a predetermined size, ratio of height to width or the like. This is typically achieved using a rules based approach such as that described in our copending application, WO 2003/01538.

In this case, the template selected corresponds to a respective element containing a number of objects and at least one content region.

At step 520 the processing system 10 operates to determine any content regions within the template and populate these with the content at step 530. At step 540 the processing system 10 operates to control the content region appearance in accordance with content region data, and in particular the content region properties, which form part of the template. Thus, the processing system 10 will operate to adjust the size and/or the format of the content regions dependent on the content region properties and the respective content.

The next stage for the processing system is to resolve the links to allow the relative position of all the components within the template to be determined.

It will be appreciated that links cannot be resolved if they form a circular relationship. Thus, in the simplest example, it is not possible for a point to be linked to itself, as the position of the point is defined in terms of the position of the point itself. In practice, it is impossible to resolve the position of the original point if that point appears again in any part of a multi-point chain, and accordingly, it is necessary to ensure that the position of each component in the template is uniquely, or singularly defined.

At step 550 the processing system 10 creates a list of components within the template, before selecting a next component in the list at step 560.

At step 570 the processing system 10 determines if there is a link associated with the respective component. If so, the process moves on to step 580 to determine if the component's spatial position within the template perimeter can be determined using the link. Thus, this will occur if the link connects the respective component, or at least part of the respective component, to a spatially defined point either within the template or within the document itself.

If a spatial position can be determined, the processing system determines the position at step 590 and stores an indication of this at step 600, and updates the list by removing the component from the list.

Following this, or if spatial properties can not be determined at step 580, the processing system 10 determines if each component in the list has been has been considered at step 610. If this is not the case, the processing system returns to step 560 to consider the next component in the list.

Once each component in the list has been considered, the processing system determines at step 620 if the list is empty. If this is the case, at step 630 the processing system operates to generate a representation of the element by positioning each of the components in accordance with the stored position indication.

However, if the list is not empty, the processing system moves on to step 640 to determine if an item has been removed from the list during the most recent parse. If not, this indicates that an unresolvable link is included in the list and accordingly, the processing system 10 generates an error at step 650. Otherwise the processing system 10 restarts the list by returning to step 560.

Figure 5B:
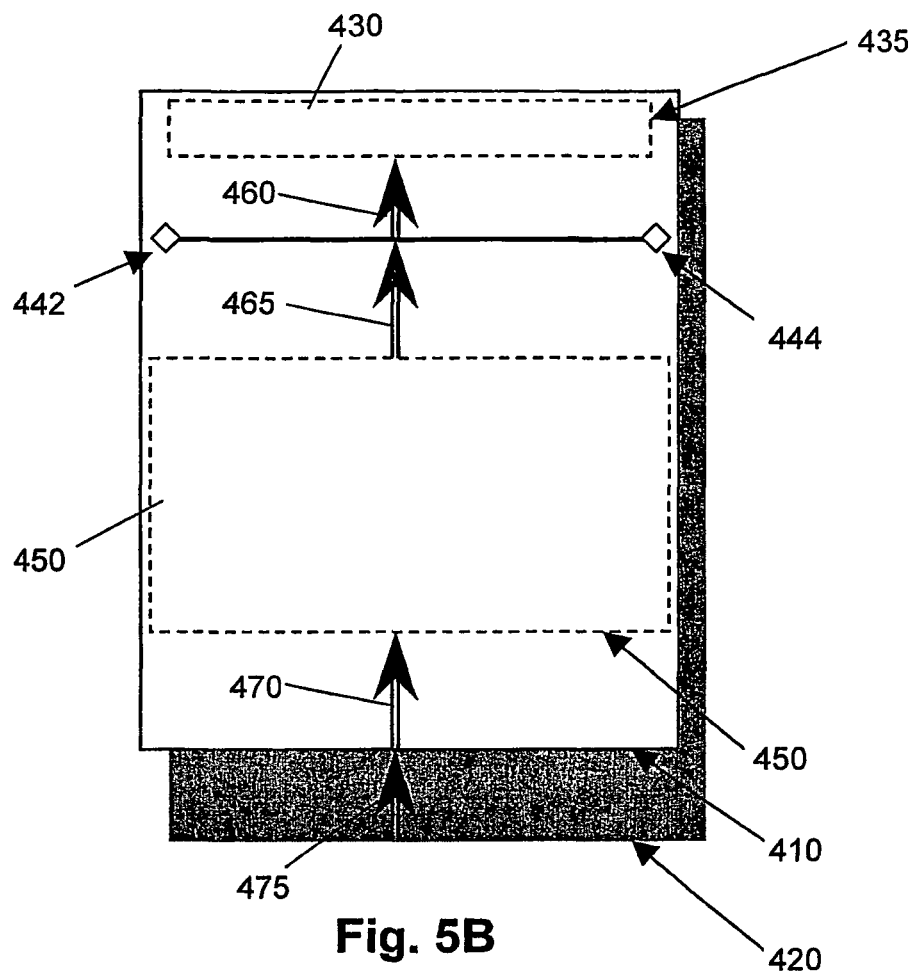
FIG. 5B is a schematic diagram of a second example template.
Figure 6C:
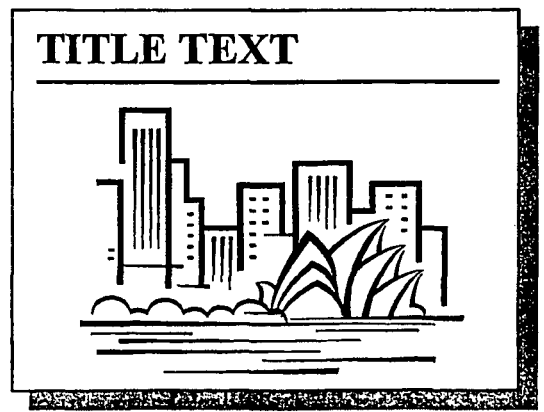
FIG. 6C is an example of a populated template according to embodiments of the present technology.
Figure 6A:
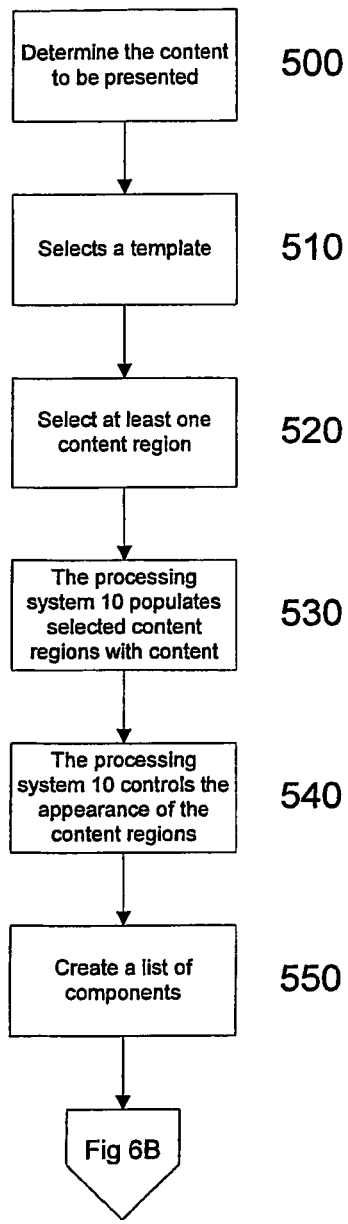
FIGS. 6A and 6B are a flow chart of the process of populating a template using the processing system of FIG. 4.
Figure 6B:
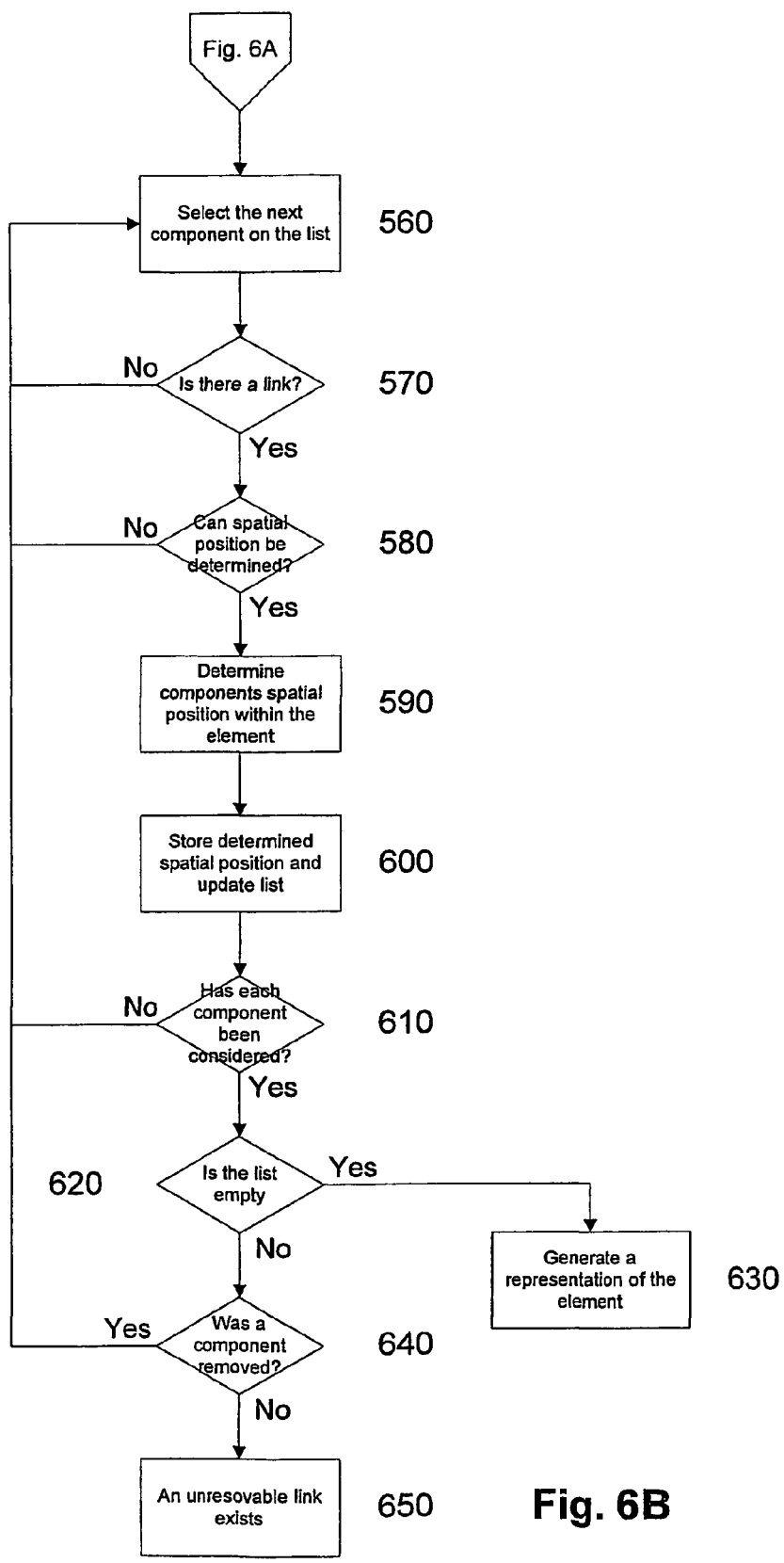

An example of the result of populating the template of FIG. 5B using this technique is shown in FIG. 6C.

In the event that an unresolvable link is found, this will occur either because the link destination cannot be uniquely defined due to a circular link or the like. Accordingly, this can be overcome by allowing a user to specify the position of the undefined component in the element design, or by allowing the user to return to the template, and correct the links defined therein.

Thus, in a preferred example, this technique resolves circular links by maintaining two lists, referred to as "ToBeSized" and "AlreadySized", respectively. When the routine is called to resolve the relationships between different linked points on the page it scans the ToBeSized list. Every point is tested to see if there are any dependent points remaining in the ToBeSized list. If there are that point is skipped over and the next point in the list is tested. Any point that either has no dependents or whose dependents are already in the AlreadySized list can have its geometrically derivative position calculated and stored. It is then deleted from the ToBeSized list and moved to the AlreadySized list.

While the term "point" is used in this example, the technique may also be applied to frames edges and other objects within the template design.

The software repeatedly scans the ToBeSized list for points that may be resolved. As points are moved from ToBeSized to AlreadySized any points in ToBeSized that referenced them may now be able to be resolved. Eventually all points will have moved to AlreadySized and the routine will finalize. However, if on any two scans of ToBeSized the total number of points remaining is identical then there exists in the list of linked points a circular reference. At this point the user may be informed, an error recorded, or a particular linking action disallowed.

Although not illustrated in the above examples, spatial dependencies may also be defined to apply on a horizontal level, or in a diagonal direction, so that widths, and left/right positions from one frame become the basis of another in the same manner that the heights and vertical positions can be made dependent, as described above.

In the above examples, the template has a perimeter including objects and content regions, generally defined as components. However, it will be appreciated by persons skilled in the art, that it is not essential for all these types of components to be provided, and that the template may include only one type of component, or more depending on the implementation.

In any event, using this method the design of an element can be automatically adjusted to suit the content. In the case where a number of different designs are provided for the same element it is further possible to trigger the automatic progression from one design of that element to another when a specified parameter is exceeded such as a frame height within one of the related element designs exceeding a certain limit. This will allow the content to be formatted according to the alternative element design.

For example, the text of an element that in the first instance would usually occupy just one column across a two-column page design may be retargeted at an element that utilises a two-column design if the text causes a frame to exceed a certain extent such as, for example, the vertical height of the page's primary text frame.

The trigger that causes the switch from one element design to the next may also be computed as the element designs are created, for example, by calculating a ratio between the height and width of each element and choosing that element design where the ratio is closest to a pre-determined value.

It is also possible to provide functionality which allows various components within a template to be repeated across the page, either vertically, horizontally or diagonally depending on the respective implementation. An example of this will now be described with reference to FIGS. 7A and 7B.

Figure 7A:
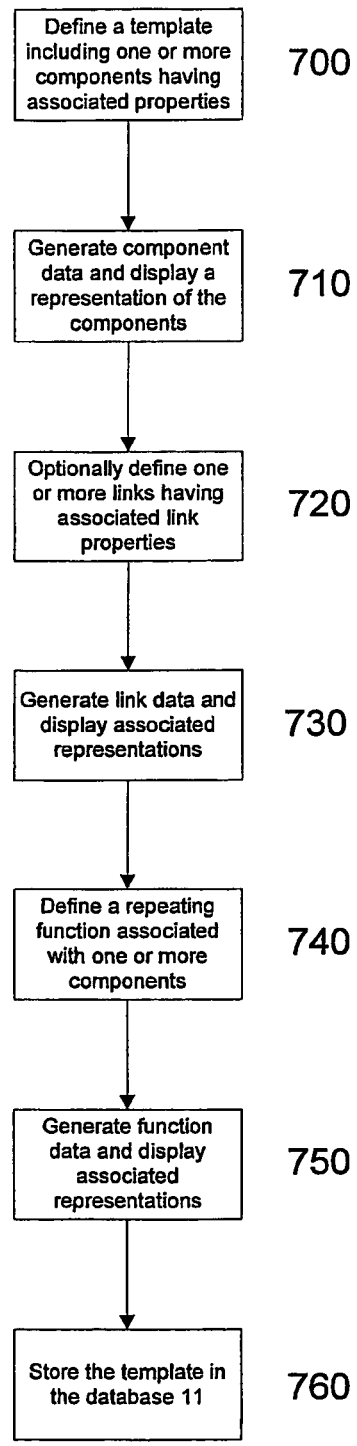
FIG. 7A is a flow chart of the process of creating a template for providing repeating functionality using the processing system of FIG. 4.

In particular, FIG. 7A sets out the steps involved in defining a template having repeating functionality. In particular, at step 700 the user operates to define a template including one or more components having associated component properties. This can be performed in a manner similar to the definition of a template as described with respect to FIG. 5A. Thus, the components may include a template perimeter, content regions and one or more objects, or the like.

In any event at step 710, the processing system generates associated component data and displays a representation of the components on a GUI.

It will therefore be appreciated by persons skilled in the art that this can be achieved, for example, using a drag and drop approach, to drop component representation provided on a GUI into a template perimeter, with the components being generally positioned as previously described.

At step 720, views optionally defines one or more links having associated link properties with processing system operating to generate link data and display associated representations at step 730.

The user then defines a repeating function associated with one or more of the components, and optionally with the associated links if these have been defined. The repeating functions defines rules regarding the manner in which the repeating will be performed, and therefore defines how many instances of a respective component are required to allow the respective content to be presented.

In any event, at step 750 processing system generates function data representing the defined repeating functions and displays associated representations. The template is then stored in the database at step 760 by storing the defined function data, data and component data.

Figure 7B:
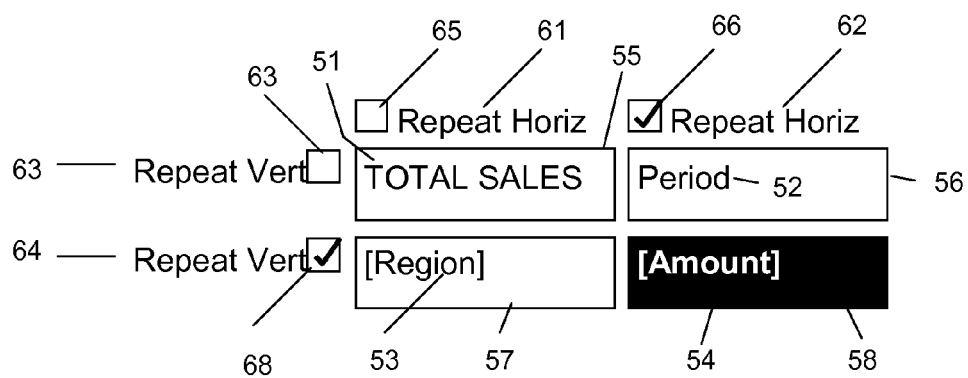
FIG. 7B is a schematic diagram of a template generated using the process of FIG. 7A.

An example of an appropriate template is shown in FIG. 7B. As shown, in this example, the template 50 is formed from four content regions, 51, 52, 53, 54, each having associated frames 55, 56, 57, 58, which together form table cells. The appearance of the cells and their contents are defined by the component properties, which in this case, includes the properties of the content regions 51, 52, 53, 54, and frames 55, 56, 57, 58.

In this example, the position of the content regions and frames, and hence the cells, are controlled in accordance with default links which are not displayed for clarity purposes, but which may not be required in some implementations as the links have default properties. In particular, the frames 56, 58 are defined to be positioned a predetermined distance from the frames 55, 57, with the frames 57, 58 being positioned a predetermined distance from the frames 55, 56 as shown.

In this example, four repeat functions are defined, including repeat functions 61, 62, 63, 64 which have appropriate responding selection boxes 65, 66, 67, 68 as shown.

In use, the repeat function 61 is associated with the content regions 51, 53 and the associated frames 55, 57. Similarly, the repeat function 62 is associated with content regions 52, 54, whilst the repeat functions 63, 64 are associated with the content regions 51, 52: 53, 54 respectively.

The repeat functions, if selected, will be used to repeat the corresponding content regions and frames a predetermined number of times dependent on the content to be presented in using the template. This allows a table to be formed, with the number of cells provided being based on the content to be presented, and with the format of the cells based on the format of the cells in the template.

In these examples, the repeating function also applies to the default links which therefore controls the position of each instance of the respective content regions.

An example of the manner in which the template may be used will now be described with referenced to FIG. 8A and FIG. 8B. In particular, in this example, the repeat functions 62, 64 are activated as shown by selection of the respective check boxes 66, 68.

At step 800, the user determines the content to be presented and provides this to the processing system 10, with a template being selected at step 810.

At step 820, one or more of the repeat functions are selected by the user making an appropriate selection in the check boxes 65, 66, 67, 68. Thus, as previously described, in this example, the user selects the check boxes 66, 68 to thereby designate selection of the repeat functions 62, 64. This indicates to the processing system that the processing regions 52, 53, 54 are to be repeated horizontally and vertically in accordance with the repeat functions.

At step 830, the processing systems determines a number of content portions from the content. Thus, in this example, the content includes a number of content portions in the form of "region" values, "period" values and "amount" values which are to be imported into the content regions 53, 52 and 54 respectively.

It will therefore be appreciated from this that the properties of the content regions 53, 52, 54 will indicate the type of content portion to be provided therein. Thus, the processing system will determine from the content region properties the content regions associated with the respective types of content portions, and then generate a corresponding number of content regions at step 840, in accordance with the defined repeat functions 62, 64.

In this example, the content to be presented includes four "region" content portions and four "period" content portions, and sixteen "amount" content portions. Thus, the processing system operates the use the repeat function to generate four content portions 52 with corresponding frames 56, four content portions 53 with corresponding frames 57, and sixteen content portions 54 with corresponding frames 58.

The processing system 10 populates the selected content regions with corresponding content portions at 850 and then controls the appearance of the content regions and frames using the defined content region and frame properties at step 860.

The content regions are then positioned in accordance with the defined links at step 870.

Thus, it will be appreciated from this, that the link associated with the frame 56 will indicate that the frame 56 is to be positioned a predetermined distance from a frame to the left.

In this case, the repeat horizontal function 62 indicates that additional instances of the frame 56 are to be positioned to the right of previous instances, in accordance with the link, so that the further frames 56 are positioned a predetermined distance from the earlier frames in the row.

Thus, it will be appreciated in this instance, that the content region and corresponding frame form a cell within a table which can be repeated with the formatting of the cell, defined in the content region and frame properties, being repeated as required.

The check marks shown in the boxes marked 'Repeat Horiz' and 'Repeat Vert' indicate that the corresponding cells are to be repeated as more content portions are provided by the content creator. The number of repeats is driven by the number of rows and columns in the content submitted.

Furthermore, the formatting of the content regions and associated frames, in this case, for the lower right hand cell 53, which has a format of white text on a black background, is repeated as additional relevant data is processed by the processing system 10.

Figure 8A:
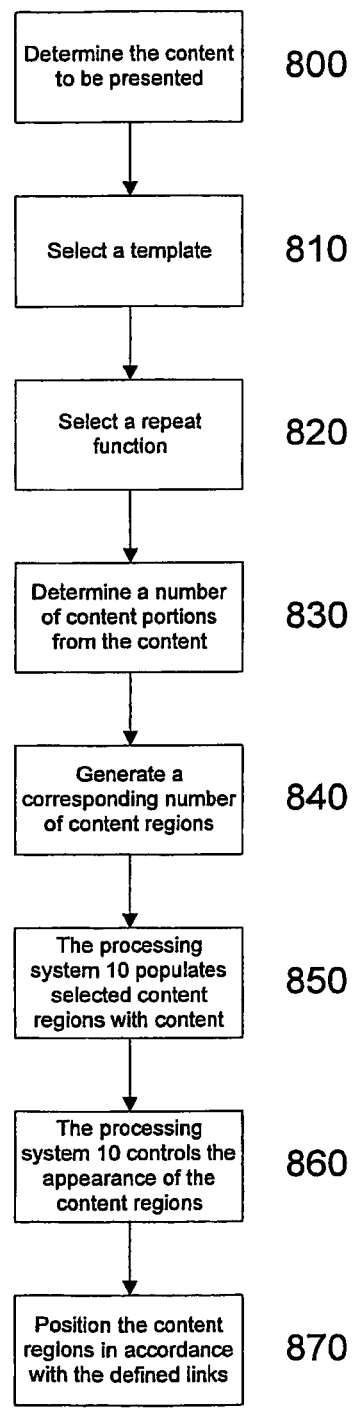
FIG. 8A is a flow chart of the process of populating the template of FIG. 7B.

The result of this procedure is the table shown in FIG. 8B, which shows a view of a sample populated table as it would appear in the finished work based on the template shown in FIG. 8A, with the repeating ability of a defined cell being interpreted by the processing system 10 to allow creation of an appropriate number of rows and columns.

It will be appreciated by persons skilled in the art, that it is possible to provide any number of the functions and associated cells. By combining repeating cells and non-repeating cells within a single table definition it is possible to create any table format with any combination of formatting options, from simple clear shading through to complex alternating vertical and horizontal patterns. This enables the appearance of the table to be defined to a certain degree before the actual extent of the rows or columns in the content is known.

Examples of this will now be described with reference to FIGS. 9A, 9B, 10A and 10B.

Figure 9A:
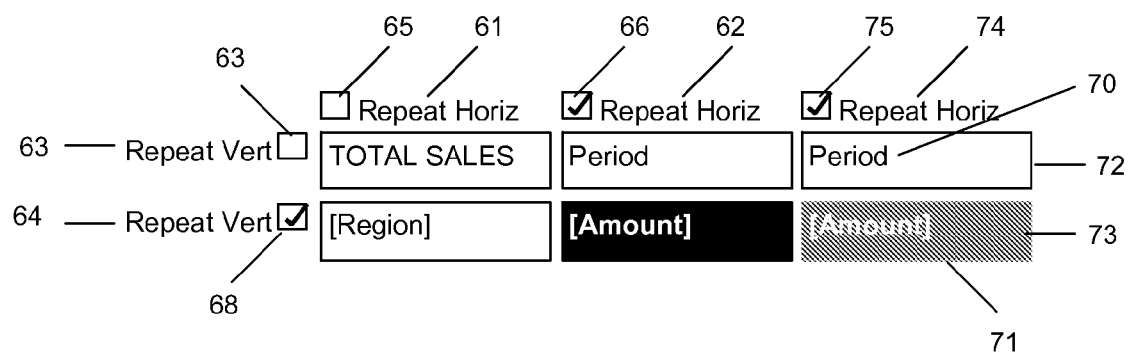

In particular, in FIG. 9A, additional content regions 70, 71 with associated frames 72, 73 are provided. An associated repeat horizontal function 74 with a corresponding check box 75 is also shown. In use, the repeat functions 62, 74 are implemented by the processing system in conjunction. In this case, as both the repeat function 62, 74 are selected by the appropriate check boxes 66, 75, a repeat function is applied to the two rightmost columns to repeat as data is added to the table, with this being used to provide for alternating light and dark shading of the cells as shown in FIG. 9B.

Figure 10A:
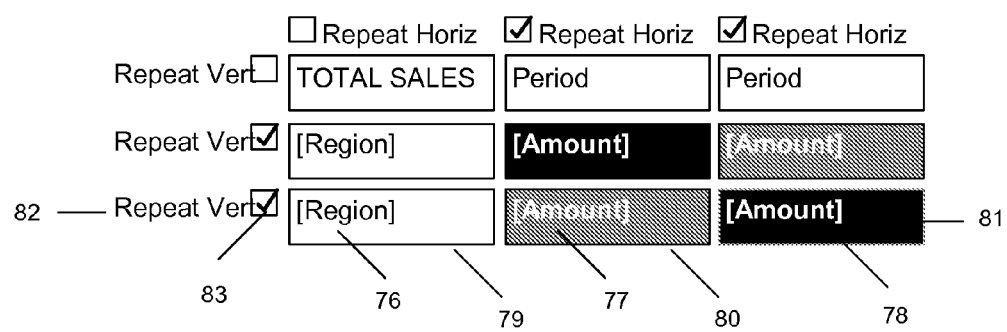

As a further alternative, this form of behaviour can be repeated in both vertical and horizontal directions as demonstrated by the template shown in FIG. 10A and the resulting table shown in FIG. 10B. Thus, in this particular case, additional cells are added by providing additional content regions 76, 77, 78 with associated frames 79, 80, 81. A further repeat function 82, having associated check box 83, is provided. This allows an additional row repeat pattern to be used such that when the template is populated, this allows a checkboard effect to be produced in FIG. 10B.

It will therefore be appreciated from this that this allows a range of complex formatting and table appearances to be achieved utilising a simple approach.

Figure 11A:
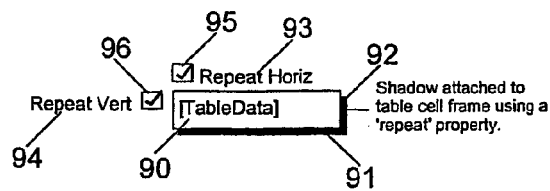
FIGS. 11A to 11C are schematic diagrams of a fourth example of a repeating template and a resulting elements generated using the process of FIGS. 7A and 8A; and,
 FIGS. 12A and 12B are schematic diagrams of a fifth example of a repeating template and a resulting element generated using the process of FIGS. 7A and 8A.
Figure 11B:
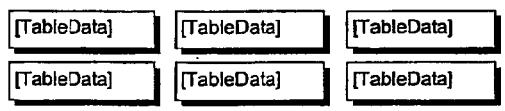
Figure 11C:
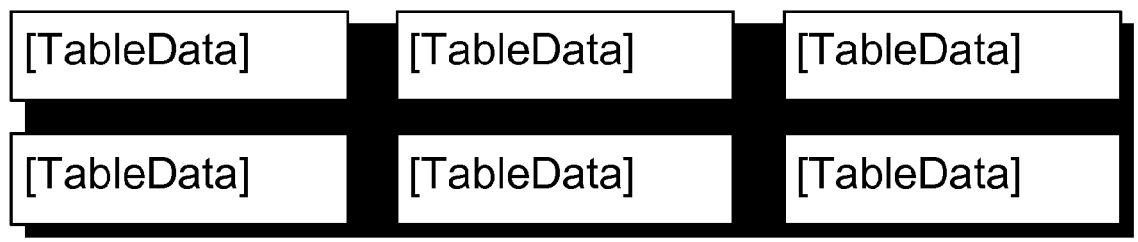

A further variation on this will now be described with reference to FIGS. 11A to 11C. In particular, in FIG. 11A, a single cell shown from a content region 90 and associated frame 91 is provided. In this case, a shadow region 92 is also associated with the frame 91. Repeating functions 93, 94 with associated check boxes 95, 96 are also defined using the methodology described above in respect of FIG. 7A.

In use, the shadow 92 is linked to the frame 91 by a link not shown. In use, the link can form a part of the repeat function so that the shadow cell is repeated each time the frame 91 is repeated as shown in FIG. 11B. Thus, in this case, the border of the background shadow frame may be linked to the border of a repeating cell within a table so that the resulting table includes a number of cells each having a dropped shadow.

Alternatively, the link can be defined so that it is outside the scope of the repeat function. In this case, the shadow cell can be linked to the final frame instance 91, so that the shadow will extend behind all of the cells as shown in FIG. 11C.

A further alternative is that the repeat function does not apply to the shadow at all, in which case the shadow will only be provided behind the first cell in the table.

This functionality may be achieved is a number of ways, but typically is achieved by providing a menu on the GUI which allows the user to specify the relationship between the repeat function and respective components and links in the template.

Thus, the repeat function may have a "on first instance" option, which if selected, will cause the shadow to appear only behind the first cell irrespective of the number of cells making up the table. Alternatively, if the repetitive behaviour is set to repeat "on each instance" of the table cell, a copy of the original shadow will be placed behind every cell making up the table, as shown in the sample table of FIG. 11B, whilst a "on last instance" option allows the shadow to be drawn behind all cells as shown in FIG. 11C.

Figure 12B:
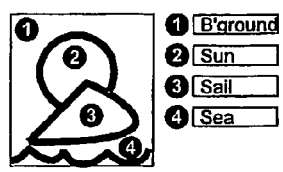
Figure 12A:
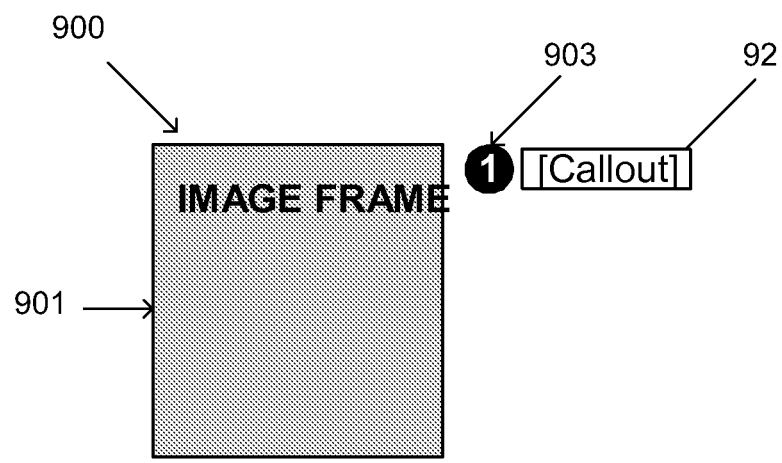

In a further example of the implementation of this, as shown in FIGS. 12A and 12B, the automated frames are used in conjunction with "incrementing counters" to achieve specific results such as an incrementing counter.

In the example of FIG. 12A, a template 900 is defined having an image frame 901, a callout frame 902 and an incrementing counter 903.

In this case, a repeating function is defined associated with the callout frame 902 and the incrementing counter 903 which depends on content imported into the image frame 901. In particular, as individual content portions are defined within the image frame the repeating function determines this and generates a new instance of the callout frame 902 and the incrementing counter 903. This allows content within the image frame 901 to be labelled with an associated legend as shown in FIG. 12B. In this instance, the repeat function is not represented in the template as it will need to be applied to each content portion positioned in the image frame, it is therefore applied automatically without control by the user.

Thus, in use, the numbers in the table on the right hand side shown in FIG. 12B are generated by each instance of the counter, which is in turn included through the processing of a callout instance included in the content. As more callouts in the image are added and referenced, a corresponding numbered entry in the callout table is created. This allows for the automatic inclusion of formatting elements external to the table to be automatically included when the inclusion of those additional formatting elements is not related to the content.

In order to achieve this, it is therefore typical to provide the counter with a defined spatial relationship to the table cell, with the repeat function having an option such as a 'repeat on every' option set. This results in processing system 10 placing a copy of the counter beside each table cell as the callouts contained in the content data set are processed.

This leads to the creation of the legend shown in FIG. 12B, with the specific elements, numbered 1 to 4 in the image being related by context to corresponding numbers in the legend on the right.

Thus, this allows the insertion of a callout number to be performed automatically by the processing system without requiring manual intervention by the content creator.

The above described system can therefore be used to allow a user to link the components of a document design so that a software application may automatically update components, either provided, on a document page or as part of an element such that spatial design characteristics are maintained even when aspects of the element design that are dependent on the content may change.

In this regard, the processes may be applied to templates having a defined perimeter, in the sense that all the components are contained within the perimeter, or may be applied to templates in which no perimeter is defined, so that the components may be positioned at any location within the document.

Furthermore, the techniques may be applied to any combination of components, and do not necessarily require the presence of a content region per se. In this case, the positioning of components may not therefore depend on a region that is sized dependent on content, but may be controlled to allow components to be arranged in accordance with any defined spatial arrangement.

As far as the content regions are concerned, it will be appreciated that a content region is simply any region that may be populated with content, and that this content may take on any form. As a result, the content could include images, text, links to other documents, embedded multi-media or the like, and the term is therefore only used to refer to a region that is populated with any form of content during the creation of the element.

This allows for a reduction the repetitive work associated with preparing content for display within a print or electronic context, or for a user interface. It also has significant application in all aspects of page-layout and document design.

This is achieved by allowing a user of a suitably programmed processing system use a graphical user interface to spatially link design components to other components of the element design such that those design components may be automatically aligned to maintain the overall design style while adapting to suit content of varying size or length.

In one example, the spatial relationship between objects on the page may be defined using a "point-and-click" graphical interface. Once the spatial relationship has been defined that same relationship can be applied automatically when other aspects of the design may change. Thus the geometrical parameters of components of the design can be recorded as being dependent on other geometrical parameters.

Thus, for example objects on a page can include points used to resize the object. The system above can provide links to the resizing points so that when the resizing point of one object is moved, the resizing point of another object is also moved.

This allows a design drawn on the page to resize to suit highly variable content while maintaining the designer's intent for the original spatial relationship between the objects on the page.

In order to assist in manipulating components, the components may include a number of handles, which allow the component to be moved or resized. In the invention a component may represent a single object or the component may represent two or more objects assigned to a group by the user. The group of objects so assigned will then be treated as a single component by the invention. An explanation of handles will now be set out with reference to FIG. 13.

Figure 13:
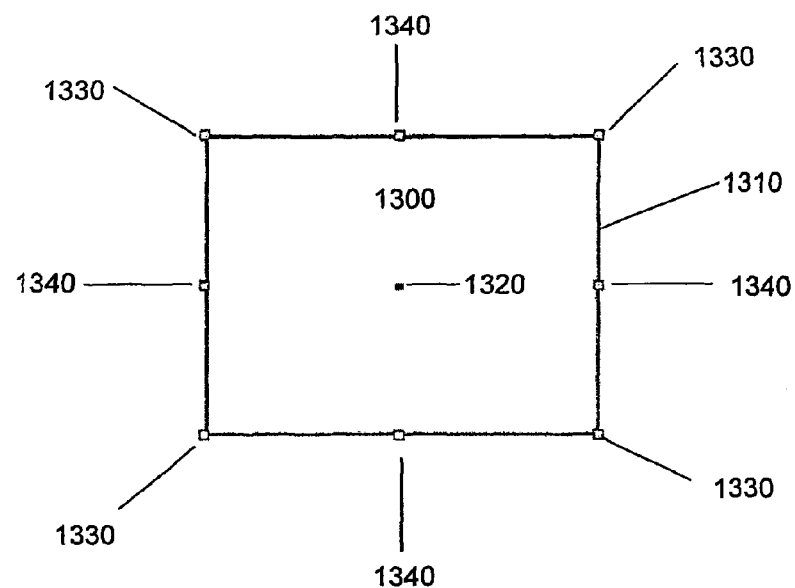
FIG. 13 is a diagram of a component including movement and resizing handles.

FIG. 13 shows a component 1300 having a frame 1310. The component 1300 includes a movement handle 1320 positioned at the midpoint of the component 1300, and a number of resizing handles 1330, 1340 provided on the frame 1310, as shown.

The resizing handles 1330, 1340 allow a user to alter the size of a component, by altering the dimensions of the frame 1310. This may be achieved using a number of mechanisms, such as dragging the respective resizing handle using a mouse, or the like, depending on the implementation.

The resizing handles 1330, 1340 are typically placed at the corners and midpoints of the frame 1310, so that, in this example, the component 1300 includes four resizing handles 1330 provided at corners of the frame 1310, and four handles provided at midpoints of the frame 1310. In one example, the corner handles 1330 may be used for resizing the entire component 1300, whereas the midpoint handles 1340 may be used for resizing the component 1340 in a single dimension, such as expanding or reducing a component 1300 in a direction orthogonal to the frame 1310.

A movement handle allows a user to move the entire component 1340 to a different position. Again, this may be achieved using a number of mechanisms, such as dragging the handle 1320 using a mouse drag and drop action depending on the implementation.

When using the movement handles 1320, the movement may additionally be constrained in a horizontal or vertical direction, in order to aid the user in positioning the component. The user may perform constrained movement of a component for example, by holding down the 'shift' key on a keyboard while dragging the movement handle 1320 using the mouse in a substantially horizontal or vertical direction depending on the implementation.

For example, if the component is dragged in a horizontal direction using the constrained movement option, the user may only be able to move the component in a horizontal direction and may be prevented from moving the component in a vertical direction until the constrained movement option has been completed.

In use, links between components may be defined between handles of different components to thereby control in the manner in which components are positioned or resized. An example of this will now be described with respect to a specific type of link called a parent/child link. In particular, a parent/child link is defined such that the position and/or size of the child component is dependent on the positioning and/or size of the parent component.

Figure 14A:
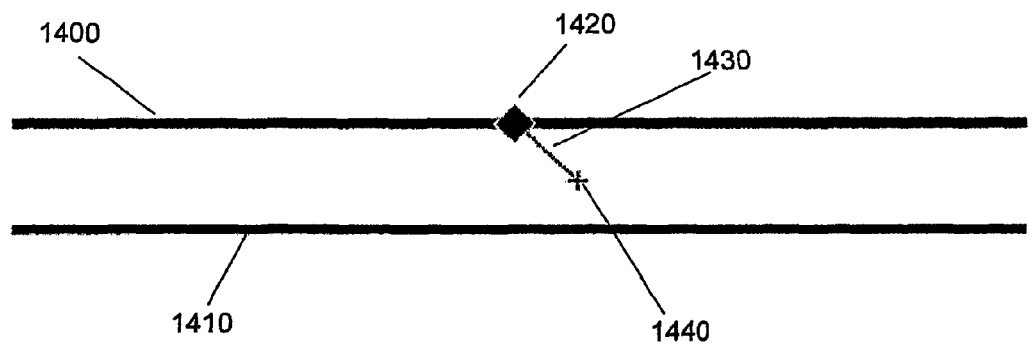
FIGS. 14A and 14B are schematic diagrams of an example of creating a parent/child link.
Figure 14B:
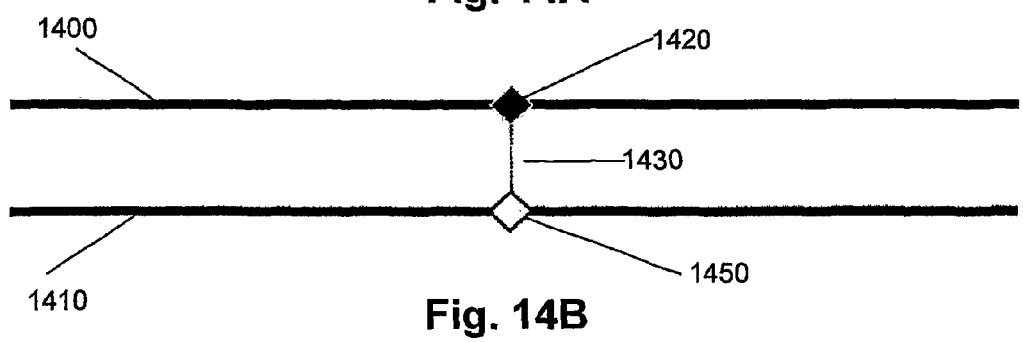

An example of this will now be described with respect to FIGS. 14A and 14B which show a parent component 1400, a child component 1410, a parent anchor 1420, a child anchor 1450, and a positional link 1430.

Thus, in this example, the positional link 1430 is defined by interconnecting movement handles and/or resizing handles of respective components so that the position or size of the child component 1410 is dependent on the size, position or other properties of the parent component 1400.

A user defines such a parent/child link by:
Selecting a parent/child link tool (not shown);
Clicking on a first handle associated with a first component in order to add a parent anchor 1420; and,
Clicking on a second handle associated with a second component in order to add a child anchor 1450.

The process of clicking on a first component and adding a parent anchor results in defining the parent component of the link. Similarly, the process of clicking on a second component and adding a child anchor results in defining the child component of the link.

Typically parent and child anchors may be represented differently such that a user may be able to distinguish them apart. For example, a parent anchor may be represented by filling the appropriate anchor with a particular pattern or colour. In this example, the parent anchor 1420 placed at a movement handle is a black filled diamond, whereas a parent anchor placed at a resizing handle is a black filled triangle. Similarly, the child anchor 1450 placed at a movement handle will be displayed as a non-filled diamond, whereas a child anchor placed at a resizing handle is a non-filled triangle.

Generally, the parent and child anchors may be displayed with a slight offset such that when a child component and a parent component are closely aligned respectively, the anchors can be easily distinguished, rather than the anchors being displayed upon one another.

People skilled in the art will appreciate that other common patterns can be used to distinguish between a parent and child anchor. Similarly, people skilled in the art will appreciate that settings may be set by the user in order to alter the pattern or colour that may be used to distinguish between a parent and child anchor. It will also be appreciated that it is possible that the child anchor may be defined prior to a parent anchor, and this setting may be defined in an options panel or window associated with the child/parent relationship.

A parent/child tool, used for defining a parent/child link may be selected from a toolbar displayed in a software application, or the like, depending on the implementation.

An example of the operation of automatic resizing using parent/child links will now be described in more detail with reference to FIG. 15A.

In this example the arrangement of components once they have been populated with content and resized appropriately are shown with a suffix of 'b'. For illustrative purposes, thin dotted lines have been used to illustrate the effects of a change in the components following the addition of content.

Figure 15A:
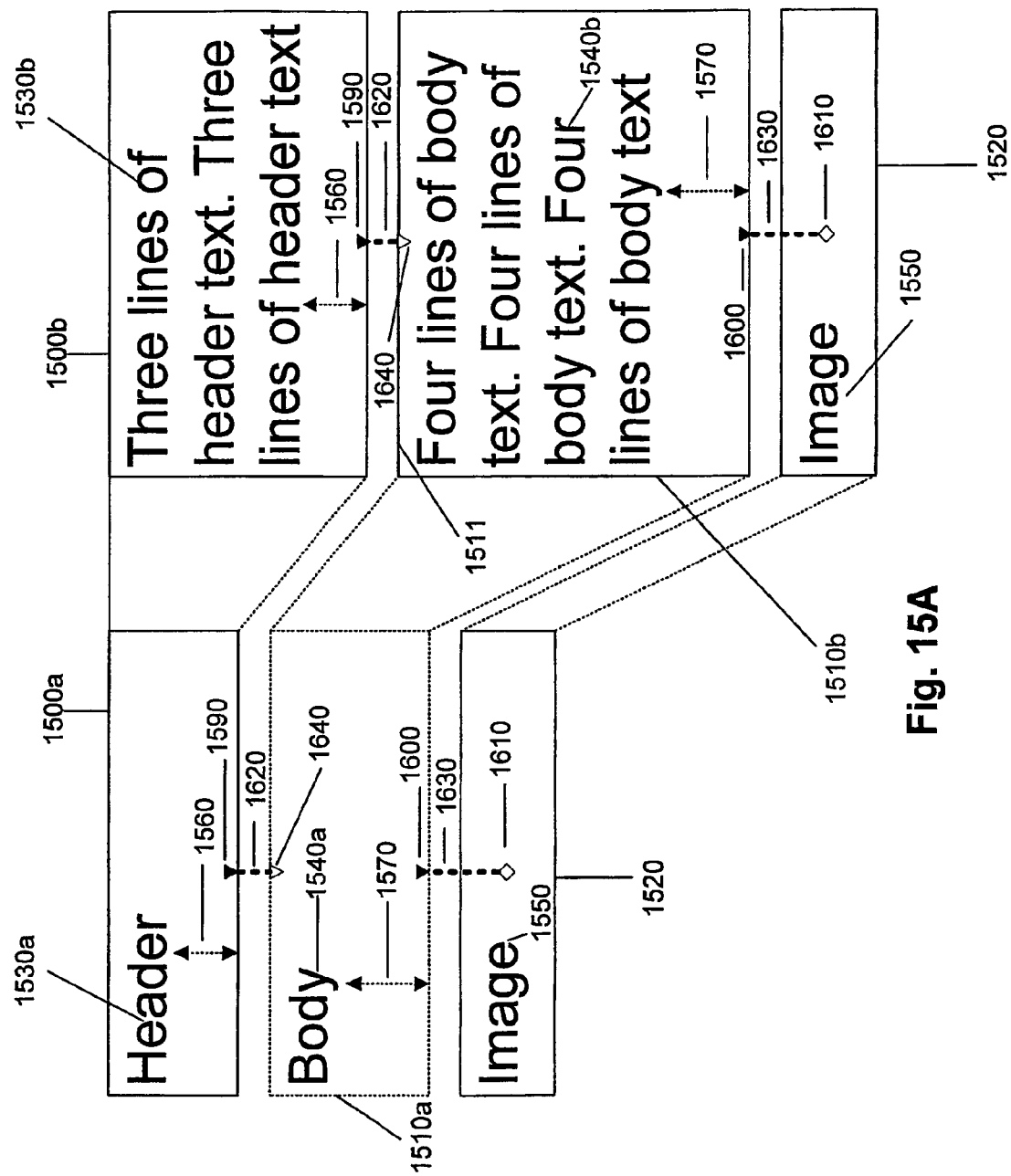
FIGS. 15A and 15B are schematic diagrams of an example of components linked together via parent/child links.

FIG. 15A shows three components in the form of first and second content regions 1500, 1510, and an image frame 1520. These components 1500, 1510, 1520 are interconnected via first and second parent/child link 1620, 1630 formed between the first and second content regions 1500, 1510, and the second content region 1510 and the image frame 1520, respectively.

The first parent/child link 1620 includes a parent anchor 1590 that has been added to a resizing handle (not shown) associated with the first content region 1500, and a child anchor 1640 that has been added to a resizing handle (not shown) associated with the second content region 1510.

The second parent/child link 1630 includes a parent anchor 1600 that has been added to a resizing handle (not shown) of the second content region 1510, and a child anchor 1610 that has been added to a movement handle (not shown) for the image frame 1520.

During the process of defining the components 1500, 1510, 1520 and the associated links, the components 1500, 1510, 1520 are typically populated with default content, as shown at 1530*a*, 1540*a*, 1550*a*.

In this particular example, the properties of the components 1500, 1510 include a predefined BaselineGap between the content and frames of the respective components, as shown by the arrows 1560, 1570.

When the first content region 1500 is populated with content 1530*b*, the first content region expands in size, as shown at 1500*b*, to maintain the BaselineGap 1560. The first content region 1500*b* is the parent component in the link 1620, and as a result, the second content region 1510 is re-sized/positioned accordingly. In this case, as the link is provided to a resizing handle of the second content region 1510, expansion of the first content region 1500*b* causes a top boundary 1511 of the second content region 1510*b* to move in a downward direction, thereby resizing the second content region.

When the second content region 1510 is populated with content 1540*b*, the second content region 1510*b* expands in size to ensure the Baselinegap 1620 is maintained at a constant distance, thereby resulting in the configuration shown.

In this case, because the second content region 1510*b* is a child component in the first parent/child link 1620, any changes in size or position of the second content region 1510*b* typically do not effect the size or position of the first content region 1500*b*.

However, the second content region 1510*b* is a parent in the second parent/child link 1630, and as such the position or size of the image frame 1520 may be adjusted accordingly. In this example the child anchor 1610 of the second parent/child link 1630 has been added to a movement handle (not shown) of the image frame 1520, and as a result the entire image frame 1520 moves in a downwards direction.

A further example relating to the automatic resizing using parent/child links will now be described with reference to FIG. 15B.

In this example the arrangement of components once they have been populated with content and resized appropriately are shown with a suffix of 'b'. It will be appreciated for illustrative purposes, thin dotted lines have been used to illustrate the effects of a change in the components following the addition of content.

Figure 15B:
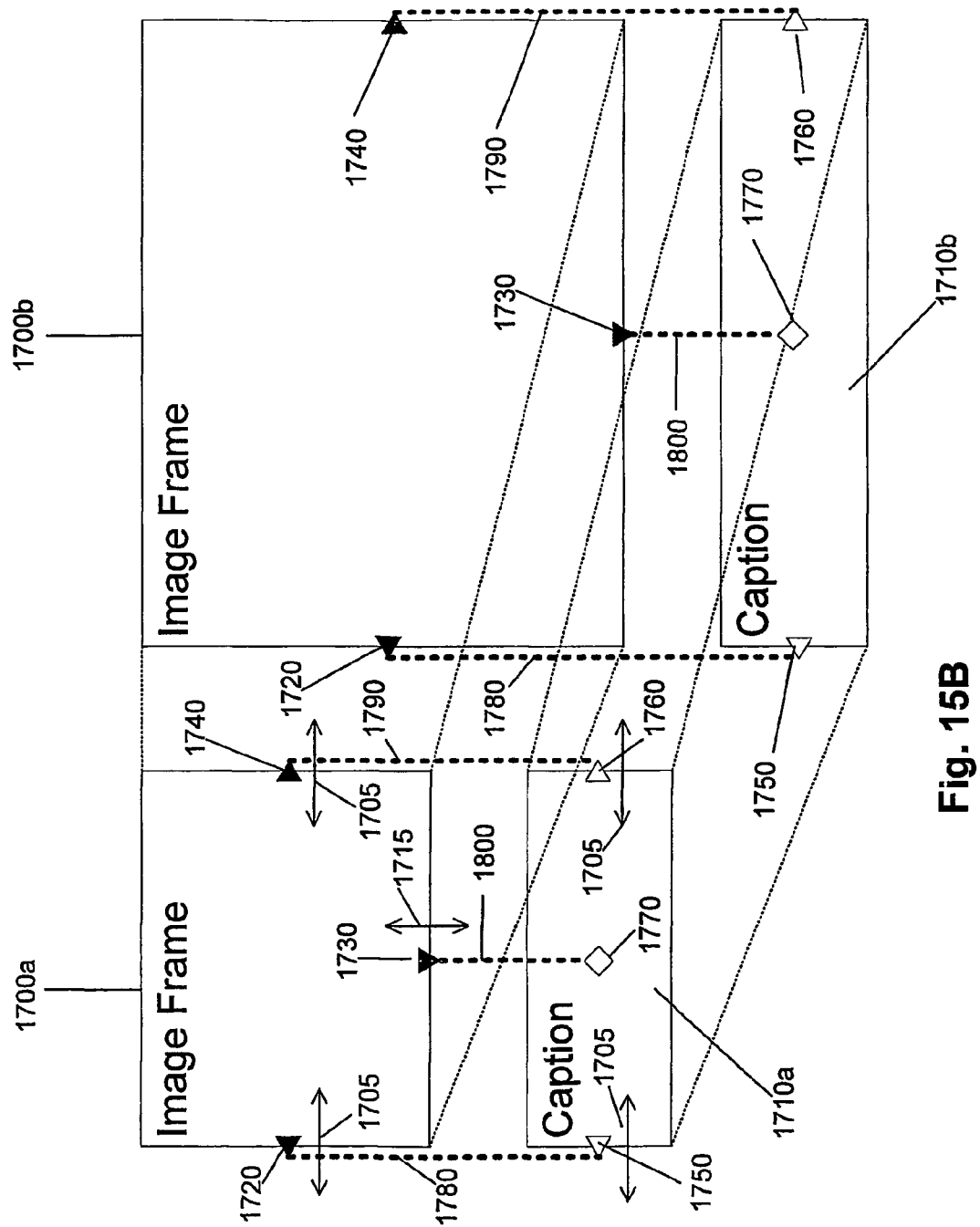

FIG. 15B shows an image frame 1700 and a content region 1710 that are linked via three parent/child links 1780, 1790, 1800. The three parent/child links 1780, 1790, 1800 have been connected between parent anchors 1720, 1730, 1740 of the image frame 1700, and child anchors 1750, 1760, 1770 of the content region 1710. Five of the anchors 1720, 1730, 1740, 1750, 1760 have been added at resizing handles (not shown) and the remaining anchor 1770 has been added at a movement handle.

When the image frame 1700 is populated with content, the content region 1700 expands as shown at 1700*b*. As a result, content region 1700 also expands, as shown at 1710*b*, due to the parent/child links 1780, 1790, 1800.

In this example, the parent/child links 1780, 1790 are coupled to the movement handles 1720, 1750 and 1740, 1760 respectively. As the movement handles 1720, 1750 and 1740, 1760 are constrained to move in a direction perpendicular to the frame to which they are attached, the movement handles must move in a direction shown by the arrows 1705. Accordingly, populating the image frame 1700 with content causes expansion of the content region in the direction of arrow 1705, as shown at 1700*b*, which in turn causes corresponding expansion of the content region 1710, as shown at 1710*b*.

Similarly, the link 1800 is coupled to the movement handle 1770, such that expansion of the image frame 1700 in the direction of arrow 1710, causes corresponding movement of the content region 1710, as shown.

It is possible that a parent/child link may be reversed. This can be achieved by the user by selecting a reverse relationship function from a menu supplied in the computer software. By reversing the parent/child link, the parent in a defined link becomes the new child, and the child becomes the parent, therefore reversing the relationship between the two components.

Additionally, it is also possible that a link may be deleted. This function can be provided in a menu similar to the reverse relationship function.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of populating a template to present content within a document, wherein the method includes, in a processing system:
   a) generating from the template, a component list including a plurality of components, wherein the plurality of components include:
      i) at least one content region; and,
      ii) at least one of:
         (1) a frame;
         (2) a template perimeter; and,
         (3) an object;
   b) determining from the template a number of links defining a respective spatial relationship between any two components;
   c) populating the at least one content region with the content, wherein a spatial size of the at least one content region is dynamically set based on populating the at least one content region with the content;
   d) for each component in the component list:
      i) determining from any links associated with the respective component whether the spatial position of the respective component is defined; and
      ii) removing the component from the component list in response to a successful determination;
   e) if there are no components remaining in the component list, generating a representation of each component in the document using the defined spatial positions;
   f) if there are components remaining in the component list, and a component was removed during previous execution of step (d)(ii), repeating step (d); and,
   g) if there are components remaining in the component list, and no component was removed during previous execution of step (d)(ii), determining that the spatial position of the remaining components cannot be determined, wherein if it is determined that the spatial position of the remaining components cannot be determined, presenting an error.

2. A method according to claim 1, further including a step of creating the template includes, in the processing system:
   a) defining the plurality of components, the components including:
      i) the at least one content region; and,
      ii) at least one of:
         (1) the frame;
         (2) the template perimeter; and,
         (3) the object;
   b) defining the at least one link.

3. A method according to claim 2, wherein the method includes, in the processing system:
   a) generating component data indicative of the plurality of components;
   b) generating link data indicative of the at least one link; and,
   c) storing the template by storing the component data and link data in a data store.

4. A method according to claim 2, wherein the method includes, in the processing system, defining content region properties, the content region properties defining at least one of:
   a) an appearance of the at least one content region;
   b) a size of at least one content region perimeter;
   c) a content type; and,
   d) an appearance of the content.

5. A method according to claim 2, wherein the method includes, in the processing system, defining component properties, the component properties defining at least one of:
   a) an appearance of at least one of the components; and,
   b) a size of at least one of the components.

6. A method according to claim 2, wherein the method includes, in the processing system, defining link properties, the link properties defining at least one of:
   a) a source and a destination for the at least one link; and,
   b) a length associated with the at least one link, the at least one link defining a predetermined separation between the source and the destination.

7. A method according to claim 6, wherein the source includes one of the components.

8. A method according to claim 2, wherein the method further includes, in the processing system, defining a first repeat function associated with a first component, the first repeat function representing rules for repeating the presentation of a representation of the first component within a page of the document.

9. A method according to claim 8, wherein the at least one link includes a repeatable link, wherein the first repeat function is associated with the repeatable link defining a spatial separation between adjacent representations of the first component presented within the page of the document.

10. A method according to claim 8, wherein the method further includes, in the processing system, defining a second repeat function associated with a second component, the second repeat function representing rules for repeating the presentation of a representation of the respective second component within the page of the document, wherein the representation of the first component is repeatedly presented in a horizontal direction and the representation of the second component is repeatedly presented in a vertical direction within the page.

11. A method according to claim 8, wherein the first component is a first content region and wherein the at least one link includes a repeatable link, wherein the method includes, in the processing system, associating the first repeat function with the first content region, wherein the processing system is responsive to the template to:
   a) determine a number of content portions;
   b) generate a plurality of first content regions corresponding to the determined number of content portions;
   c) populate each first content region with a respective content portion;
   d) generate a representation of each first content region using content region properties; and,
   e) position the representation of each first content region within the page of the document using the repeatable link, wherein the repeatable link defines a spatial separation between adjacent representations of the first content region presented within the page of the document.

12. A method according to claim 1, wherein the method includes, in the processing system:
   a) determining from the template, component data indicative of the plurality of components; and,
   b) determining from the template, link data indicative of the at least one link.

13. A method according to claim 1, wherein the method includes, in the processing system:
   a) determining from the template, content region properties, the content region properties defining at least one of:
      i) an appearance of the at least one content region;
      ii) a size of at least one content region perimeter;
      iii) a content type; and, iv) an appearance of the content; and,
b) generating the at least one content region representation in accordance with the content region properties.

14. A method according to claim 1, wherein the method includes, in the processing system:
   a) determining from the template, component properties, the component properties defining at least one of:
      i) an appearance of at least one of the components; and,
      ii) a size of at least one of the components; and,
   b) generating the representation of the plurality of components in accordance with the content region properties.

15. A method according to claim 1, wherein the method includes, in the processing system:
   a) determining link properties, the link properties defining at least one of:
      i) a source and a destination for the at least one link; and,
      ii) a length associated with the at least one link defining a predetermined separation between the source and the destination; and
   b) dynamically positioning at least one of the components in the document in accordance with the link properties.

16. A method according to claim 15, wherein the source includes one of the components.

17. A method according to claim 1, wherein the plurality of components includes a first component, wherein the method further includes, in the processing system:
   a) determining a first repeat function associated with the first component, wherein the first repeat function represents rules for repeating the presentation of a representation of the first component; and,
   b) repeatedly presenting the representation of the first component within a page of the document in accordance with the associated first repeat function.

18. A method according to claim 17, wherein the at least one link includes a repeatable link, wherein the repeat function is associated with the repeatable link, and wherein the method includes, in the processing system, repeatedly presenting the representation of the first component within the page in accordance with the repeatable link, wherein the repeatable link defines a spatial separation between adjacent representations of first component within the page of the document.

19. A method according to claim 18, wherein the plurality of components includes a second component, wherein the method further includes, in the processing system:
   a) determining a second repeat function associated with the second component, the second repeat function representing rules for repeating the presentation of a representation of the second component; and,
   b) repeatedly presenting the representation of the second component within the page of the document in accordance with the second repeat function, wherein the representations of the first component is repeatedly presented in a horizontal direction and the representations of the second component is repeatedly presented in a vertical direction within the page.

20. A method according to claim 17, wherein the at least one link includes a repeatable link and the first component is a first content region, wherein the method includes in the processing system:
   a) determining a number of content portions;
   b) generating a plurality of first content regions corresponding to the determined number of content portions;
   c) populating each first content region with a respective content portion;
   d) generating a representation of each content region using the content region properties; and,
   e) positioning the representation of each first content region within the page of the document using the repeatable link, wherein the repeatable link defines a spatial separation between adjacent representations of the first content region within the page of the document.

21. A method according to claim 1, wherein the method includes, in the processing system:
   a) determining link properties for the at least one link, wherein the link properties for the at least one link define a predetermined spatial separation between the respective two components of the respective link; and
   b) dynamically positioning the representation of the respective component in the document in accordance with the link properties.

22. A method according to claim 1, wherein the method includes in a processing system:
   a) determining from the template an additional link defining a respective spatial relationship between one of the components and the document;
   b) using the additional link and the spatial size of the content region to dynamically control the spatial positioning of the representation of the respective component within the document.

23. A method according to claim 1, wherein the error presents an option selected from the group consisting of: receiving a specified position of the remaining components and receiving a command to return to the template.

24. A processing station used for populating a template to present content within a document, wherein the processing station includes:
   a) a display; and,
   b) a processor for:
      i) generating from the template, a component list including a plurality of components, wherein the plurality of components include:
         (1) at least one content region; and,
         (2) at least one of:
            (a) a frame;
            (b) a template perimeter; and,
            (c) an object;
      ii) determining from the template at least one link defining a respective spatial relationship between any two components;
      iii) populating the content region with the content, wherein a spatial size of the content region is dynamically set based on populating the content region with the content;
      iv) for each component in the component list:
         1) determining from any links associated with the respective component whether the spatial position of the respective component is defined; and
         2) removing the component from the component list in response to a successful determination;
      v) if there are no components remaining in the component list, generating a representation of each component in the document using the defined spatial positions;
      vi) if there are components remaining in the component list, and a component was removed during previous execution of step (iv)(2), repeating step (iv); and,
      vii) if there are components remaining in the component list, and no component was removed during previous execution of step (iv)(2), determining that the spatial position of the remaining components cannot be determined, wherein if it is determined that the spatial position of the remaining components cannot be determined, presenting an error.

25. A processing station according to claim 24, wherein the processing system is further configured to create the template for presenting content within a document, wherein the processing station includes:
   a) a display;
   b) a processor for:
      i) defining the plurality of components, the components including:
         (1) the at least one content region; and,
         (2) the at least one of:
            (a) the frame;
            (b) the template perimeter; and,
            (c) the object;
      ii) defining the at least one link.

26. A processing station according to claim 24, wherein the processing station is configured to:
   a) determine from the template, component data indicative of the plurality of components; and,
   b) determine from the template, link data indicative of the at least one link.

27. A processing station according to claim 24, wherein the processing station is configured to:
   a) determine from the template, content region properties, the content region properties defining at least one of:
      i) an appearance of the at least one content region;
      ii) a size of at least one content region perimeter;
      iii) a content type; and,
      iv) an appearance of the content; and,
   b) generate the at least one content region representation in accordance with the content region properties.

28. A processing station according to claim 24, wherein the processing station is configured to:
   a) determine from the template, component properties, the component properties defining at least one of:
      i) an appearance of at least one of the components; and,
      ii) a size of at least one of the components; and,
   b) generate at least one of the component representations in accordance with the content region properties.

29. A processing station according to claim 24, wherein the processing station is configured to:
   a) determine link properties, the link properties defining at least one of:
      i) a source and a destination for the at least one link; and,
      ii) a length associated with the at least one link; and,
   b) dynamically position at least one of the components in the document in accordance with the link properties.

30. A processing station according to claim 29, wherein the source includes one of the components.

31. A processing station according to claim 24, wherein the plurality of components includes a first component, wherein the processing station is configured to:
   a) determine a first repeat function associated with the first component, wherein the first repeat function represents rules for repeating the presentation of a representation of the first component; and,
   b) repeatedly present the representation of the first component in a page of the document in accordance with the associated first repeat function.

32. A processing station according to claim 31, wherein the at least one link includes a repeatable link, wherein the repeat function is associated with the repeatable link, and wherein the processing station is configured to repeatedly present the representation of the first component within the page of the document in accordance with the repeatable link, wherein the repeatable link defines a spatial separation between adjacent representations of the first component presented within the page of the document.

33. A processing station according to claim 31, wherein the plurality of components includes a second component, wherein the processing station is configured to:
   a) determine a second repeat function associated with the second component, the second repeat function representing rules for repeating the presentation of a representation of the second component; and,
   b) repeatedly present the representation of the second component within the page of the document in accordance with the associated second repeat function, wherein the representation of the first component is repeatedly presented in a horizontal direction and the representation of the second component is repeatedly presented in a vertical direction within the page.

34. A processing station according to claim 31, wherein the first component is a first content region and the at least one link includes a repeatable link, wherein the processing station is further configured to:
   a) determine a number of content portions;
   b) generate a plurality of first content regions corresponding to the determined number of content portions;
   c) populate each first content region with a respective content portion;
   d) generate a representation of each first content region using the content region properties; and,
   e) position the representation of each first content region within the page of the document using the repeatable link, wherein the repeatable link defines a spatial separation between adjacent representations of the first content region within the page of the document.

35. A processing station according to claim 24, wherein the processing station is configured to:
   a) determine link properties for the at least one link, wherein the link properties for the at least one link define a predetermined spatial separation between the two components of the respective link; and
   b) dynamically position the representation of the respective component in the document in accordance with the link properties.

36. A processing station according to claim 24, wherein the processor is configured to:
   a) determine from the template an additional link defining a respective spatial relationship between one of the components and the document;
   b) using the additional link and the spatial size of the content region to dynamically control the spatial positioning of the representation of the respective component within the document.

37. A processing system according to claim 24, wherein the error presents an option selected from the group consisting of: receiving a specified position of the remaining components and receiving a command to return to the template.

* * * * *

UNITED STATES PATENT AND TRADEMARK OFFICE
CERTIFICATE OF CORRECTION

PATENT NO.       : 8,719,699 B2                                          Page 1 of 1
APPLICATION NO. : 11/597162
DATED            : May 6, 2014
INVENTOR(S)      : Stephen James O'Brien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1959 days.

Signed and Sealed this

Twenty-ninth Day of September, 2015

Michelle K. Lee
*Director of the United States Patent and Trademark Office*